United States Patent
Xu et al.

(10) Patent No.: US 10,089,005 B2
(45) Date of Patent: Oct. 2, 2018

(54) MOBILE DEVICE, HMD AND SYSTEM

(71) Applicant: LG ELECTRONICS INC., Seoul (KR)

(72) Inventors: Xuelong Xu, Seoul (KR); Sungchul Shin, Seoul (KR); Jooyoung Kim, Seoul (KR); Nakhoon Go, Seoul (KR); Minhyung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/511,817

(22) PCT Filed: Dec. 8, 2014

(86) PCT No.: PCT/KR2014/012002
§ 371 (c)(1),
(2) Date: Mar. 16, 2017

(87) PCT Pub. No.: WO2016/047863
PCT Pub. Date: Mar. 31, 2016

(65) Prior Publication Data
US 2017/0308258 A1    Oct. 26, 2017

(30) Foreign Application Priority Data
Sep. 26, 2014 (KR) .................. 10-2014-0129190

(51) Int. Cl.
*G06F 3/0488* (2013.01)
*G06T 3/40* (2006.01)
(Continued)

(52) U.S. Cl.
CPC ....... *G06F 3/0488* (2013.01); *G02B 27/0172* (2013.01); *G06T 3/40* (2013.01);
(Continued)

(58) Field of Classification Search
None
See application file for complete search history.

(56) References Cited

U.S. PATENT DOCUMENTS 8,427,396 B1 * 4/2013 Kim .................. G06F 3/1454
345/8
2012/0127284 A1    5/2012 Bar-Zeev et al.
(Continued)

FOREIGN PATENT DOCUMENTS

EP        1 637 975 A1    3/2006
KR   10-2014-0010715 A    1/2014
(Continued)

*Primary Examiner* — Nicholas Lee
(74) *Attorney, Agent, or Firm* — Birch, Stewart, Kolasch & Birch, LLP

(57) ABSTRACT

Disclosed are a mobile device, an HMD and a system. A mobile device which is capable of data communication with an HMD, according to one embodiment of the present invention, comprises: a touch sensing module which is designed to recognize a touch from a user; a communication module which performs data communication with a head-mounted display (HMD); a video processor which if relative location information between the mobile device and the HMD is received from the HMD, generates extended video data on the basis of the location information; and a controller which after the generated extended video data is transmitted to the HMD via the communication module, controls the extended video data output by the HMD.

20 Claims, 21 Drawing Sheets

(51) Int. Cl.
  *G06T 7/70*  (2017.01)
  *G02B 27/01*  (2006.01)
(52) U.S. Cl.
  CPC .......... *G06T 7/70* (2017.01); *G02B 2027/014* (2013.01); *G02B 2027/0138* (2013.01); *G02B 2027/0147* (2013.01); *G06T 2207/30204* (2013.01)

(56) References Cited

U.S. PATENT DOCUMENTS

| | | |
|---|---|---|
| 2012/0242560 A1 | 9/2012 | Nakada et al. |
| 2014/0232648 A1 | 8/2014 | Park et al. |
| 2014/0282275 A1 | 9/2014 | Everitt et al. |

FOREIGN PATENT DOCUMENTS

| | | |
|---|---|---|
| KR | 10-2014-0029901 A | 3/2014 |
| KR | 10-2014-0054611 A | 5/2014 |
| WO | WO 2013/009047 A2 | 1/2013 |

\* cited by examiner (a)

(b)

(a)

(b)

(a)

(b)

(a)

(b)

(a)

(b)

(a)

(b)

(a)

(b)

MOBILE DEVICE, HMD AND SYSTEM

CROSS REFERENCE TO RELATED APPLICATIONS

This application is the National Phase of PCT International Application No. PCT/KR2014/012002, filed on Dec. 8, 2014, which claims priority under 35 U.S.C. 119(a) to Patent Application No. 10-2014-0129190, filed in Republic of Korea on Sep. 26, 2014, all of which are hereby expressly incorporated by reference into the present application.

TECHNICAL FIELD

The present invention relates to a mobile device, HMD (head mounted display), system and controlling method thereof. For instance, the present invention is applicable to all technologies for controlling HMD using a touch interface of a mobile device.

BACKGROUND ART

HMD (head mounted display) means a display device capable of directly showing an image or video in front of user's eyes by being mounted on a head or eye part. For example of the HMD, there is a see-through type HMD. And, the see-through type HMD is advantageous in implementing a virtual (imaginary) image of a large screen greater than a real panel size by enlarging an image displayed on a display panel (e.g., LCD, DMD, LCoS, OLED, etc.) through optical lenses.

However, since most of the input mechanisms of a related art HMD are very slow and inconvenient for a user, they cause a problem of failing to provide an efficient input tool to a user accustomed to a smartphone and the like. Therefore, the demand for an input mechanism of a new type is increasingly rising to solve the problem of the very inconvenient input mechanism of the HMD.

Meanwhile, a related art mobile device (e.g., a smartphone) has a problem that a user has to repeat a touch input for enlarging and reducing a specific portion of a screen due to a limited display size. Of course, a display size of a mobile device tends to increase. Yet, in aspect of mobility of a mobile device, there is a technical limitation put on increasing a screen size unlimitedly.

DISCLOSURE OF THE INVENTION

Technical Task

The technical task of the present invention is to substantially obviate one or more problems due to limitations and disadvantages of the related art.

One technical task of the present invention is to define an efficient input mechanism to control HMD.

Another technical task of the present invention is to provide a solution for overcoming a display size limit of a mobile device.

Further technical task of the present invention is to solve problems expected in a process for using a mobile device as a means for controlling HMD.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In one technical aspect of the present invention, provided herein is a method of controlling a system including a mobile device and an HMD (head-mounted display), including connecting the mobile device and the HMD to each other by wired or wireless data communication, detecting a location of the mobile device using a sensor installed in the HMD, sending location information of the detected location of the mobile device to the mobile device from the HMD, creating enlarged video data from the mobile device based on the sent location information of the mobile device, sending the created enlarged video data to the HMD from the mobile device, and outputting the sent enlarged video data from the HMD.

In one technical aspect of the present invention, provided herein is a mobile device capable of data communication with an HMD, including a touch sensing module designed to recognize a touch from a user, a communication module performing the data communication with the HMD (head-mounted display), a video processor, if receiving relative location information between the mobile device and the HMD from the HMD, creating enlarged video data based on the location information, and a controller controlling the enlarged video data outputted by the HMD after sending the created enlarged video data to the HMD through the communication module.

In one technical aspect of the present invention, provided herein is an HMD (head-mounted display) capable of communication with a mobile device, including a communication module performing the data communication with the mobile device, a camera sensor detecting a location of the mobile device, a video processor designed to output video data as a virtual image, and a controller controlling the communication module, the camera sensor and the video processor by being coupled with the communication module, the camera sensor and the video processor, wherein the controller is configured to control the communication module to send the detected location information of the mobile device to the mobile device and receive enlarged video data from the mobile device and wherein the controller is further configured to control the video processor to output the received enlarged video data as a virtual image.

Advantageous Effects

The technical features or effects according to one of embodiments of the present invention are described as follows.

According to one embodiment of the present invention, an efficient input mechanism for controlling HMD is defined. Meanwhile, a glove for a user input according to a related art causes inconvenience to a user because of wearing and carrying the glove each time. A gesture recognition mechanism of another related art has low accuracy. And, a voice recognition mechanism of further related art has a problem of causing noise damage to people in a public place. On the other hand, in case of using a mobile device touch proposed by the present invention, the above problems can be overcome.

According to another embodiment of the present invention, a solution for overcoming a display size limit of a mobile device is provided.

According to further embodiment of the present invention, a large-screen virtual (imaginary) image of HMD is controlled through a touch interface of a mobile device. And, a screen bigger than a physical display size of a mobile device can be provided to a user.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

Figure 23:
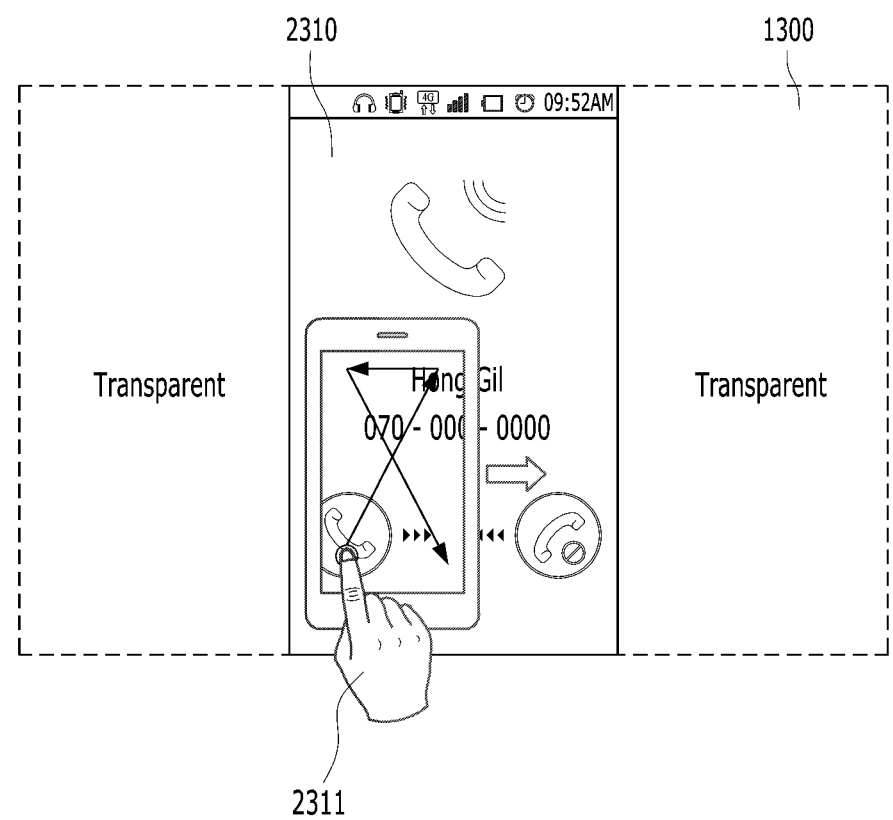

And, FIG. 23 shows another example of a graphic image outputted by an HMD if receiving a call signal through a mobile device according to one embodiment of the present invention.

BEST MODE FOR INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signage and the like.

Figure 1A:
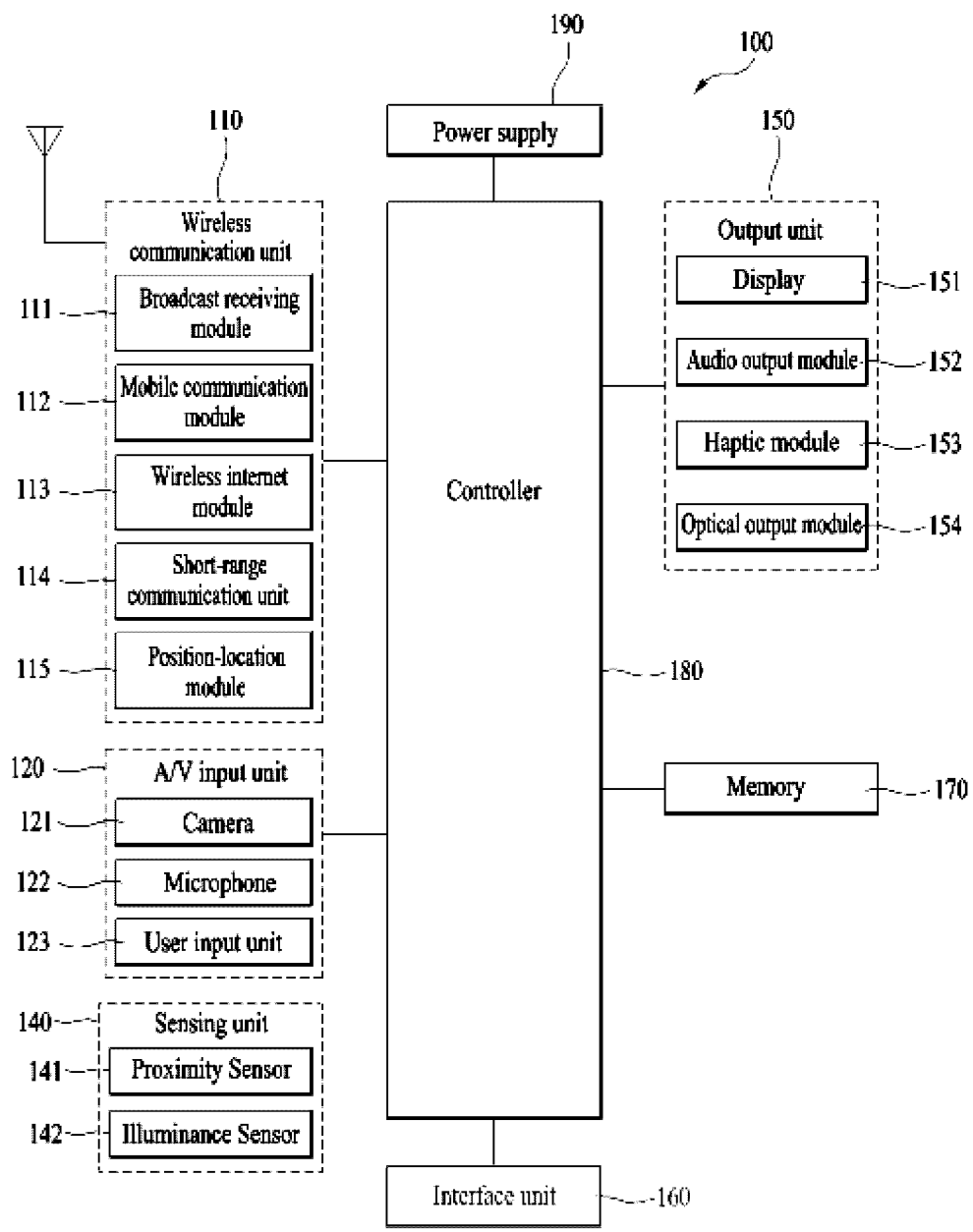
FIG. 1A is a block diagram to describe a mobile terminal related to the present invention.
Figure 1B:
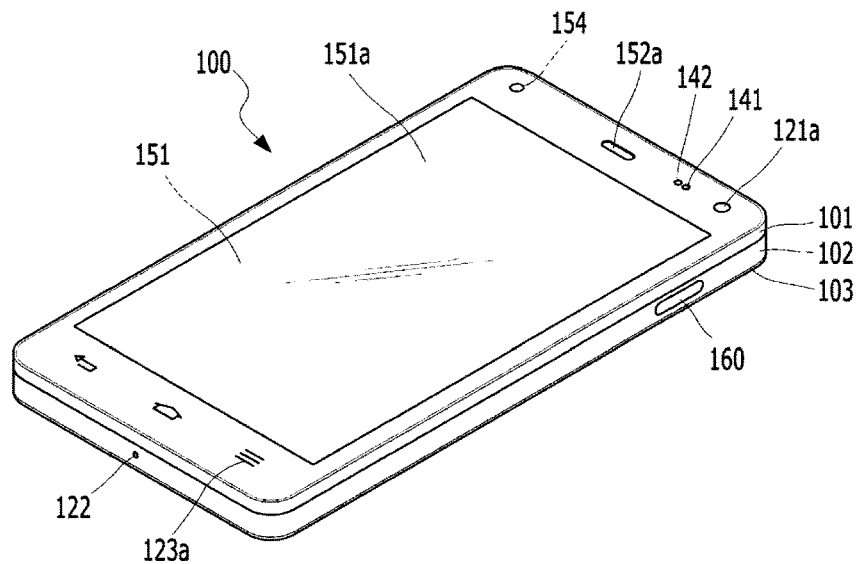
FIG. 1B and FIG. 1C are conceptual diagrams for one example of a mobile terminal related to the present invention viewed in different directions, respectively.
Figure 1C:
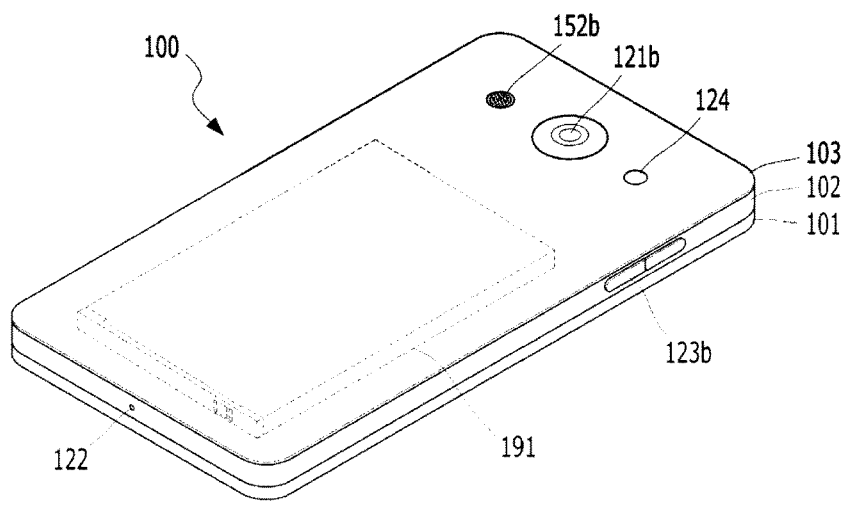

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least one portion of the respective components can cooperatively operate to implement operations, controls or controlling methods of a mobile terminal according to various embodiments in the following description. And, the operations, controls or controlling methods of the mobile terminal can be implemented on the mobile terminal by running at least one application program saved to the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless signals may include voice call signals, video call signals or various types of data according to text/multimedia message transmission/reception.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114.

Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, the controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

Herein, the terminal body may be conceptually understood as indicating at least one assembly of the mobile terminal 100.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output units 152a and 152b, a proximity sensor 141, an illumination sensor 142, an optical output unit 154, first and second cameras 121a and 121b, first and second manipulation units 123a and 123b, a microphone 122, an interface unit 160 and the like.

In the following description, as shown in FIG. 1B and FIG. 1C, described is one example of the mobile terminal 100 having components disposed as follows. On a front side of the terminal body, the display unit 151, the first audio output unit 152a, the proximity sensor 142, the optical output unit 154, the first camera 121a and the first manipulation unit 123a are disposed. On a lateral side of the terminal body, the second manipulation unit 123b, the microphone 122 and the interface unit 160 are disposed. And, on a rear side of the terminal body, the second audio output unit 152b and the second camera 121b are disposed.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. For instance, the display unit 151 can display running screen information of an application program run on the mobile terminal 100 or UI/GUI (user interface/graphic user interface) information according to such running screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown adjacent to the second camera 121b. When an image of a subject is captured with the camera 121b, the flash 124 may illuminate the subject.

The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Meanwhile, according to the present invention, information processed by a mobile terminal can be displayed using a flexible display. This is described in detail with reference to the accompanying drawings as follows.

Figure 2:
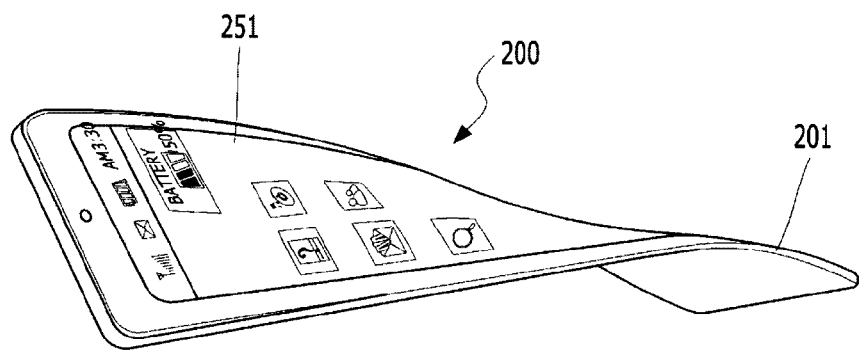
FIG. 2 is a conceptual diagram to describe another example of a transformable mobile terminal according to the present invention.

FIG. 2 is a conceptual view of a deformable mobile terminal according to an alternative embodiment of the present invention.

In this figure, mobile terminal 200 is shown having display unit 251, which is a type of display that is deformable by an external force. This deformation, which includes display unit 251 and other components of mobile terminal 200, may include any of curving, bending, folding, twisting, rolling, and combinations thereof. The deformable display unit 251 may also be referred to as a "flexible display unit." In some implementations, the flexible display unit 251 may include a general flexible display, electronic paper (also known as e-paper), and combinations thereof. In general, mobile terminal 200 may be configured to include features that are the same or similar to that of mobile terminal 100 of FIGS. 1A-1C.

The flexible display of mobile terminal 200 is generally formed as a lightweight, non-fragile display, which still exhibits characteristics of a conventional flat panel display, but is instead fabricated on a flexible substrate which can be deformed as noted previously.

The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When in a state that the flexible display unit 251 is not deformed (for example, in a state with an infinite radius of curvature and referred to as a first state), a display region of the flexible display unit 251 includes a generally flat surface. When in a state that the flexible display unit 251 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized in such a manner that a light emission of each unit pixel (sub-pixel) arranged in a matrix configuration is controlled independently. The unit pixel denotes an elementary unit for representing one color.

According to one alternative embodiment, the first state of the flexible display unit 251 may be a curved state (for example, a state of being curved from up to down or from right to left), instead of being in flat state. In this embodiment, when an external force is applied to the flexible display unit 251, the flexible display unit 251 may transition to the second state such that the flexible display unit is deformed into the flat state(or a less curved state) or into a more curved state.

If desired, the flexible display unit 251 may implement a flexible touch screen using a touch sensor in combination with the display. When a touch is received at the flexible touch screen, the controller 180 can execute certain control corresponding to the touch input. In general, the flexible touch screen is configured to sense touch and other input while in both the first and second states.

One option is to configure the mobile terminal 200 to include a deformation sensor which senses the deforming of the flexible display unit 251. The deformation sensor may be included in the sensing unit 140.

The deformation sensor may be located in the flexible display unit 251 or the case 201 to sense information related to the deforming of the flexible display unit 251. Examples of such information related to the deforming of the flexible display unit 251 may be a deformed direction, a deformed degree, a deformed position, a deformed amount of time, an acceleration that the deformed flexible display unit 251 is restored, and the like. Other possibilities include most any type of information which can be sensed in response to the curving of the flexible display unit or sensed while the flexible display unit 251 is transitioning into, or existing in, the first and second states.

In some embodiments, controller 180 or other component can change information displayed on the flexible display unit 251, or generate a control signal for controlling a function of the mobile terminal 200, based on the information related to the deforming of the flexible display unit 251. Such information is typically sensed by the deformation sensor.

The mobile terminal 200 is shown having a case 201 for accommodating the flexible display unit 251. The case 201 can be deformable together with the flexible display unit 251, taking into account the characteristics of the flexible display unit 251.

A battery (not shown in this figure) located in the mobile terminal 200 may also be deformable in cooperation with the flexible display unit 261, taking into account the characteristic of the flexible display unit 251. One technique to implement such a battery is to use a stack and folding method of stacking battery cells.

The deformation of the flexible display unit 251 not limited to perform by an external force. For example, the flexible display unit 251 can be deformed into the second state from the first state by a user command, application command, or the like.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 may transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 3:
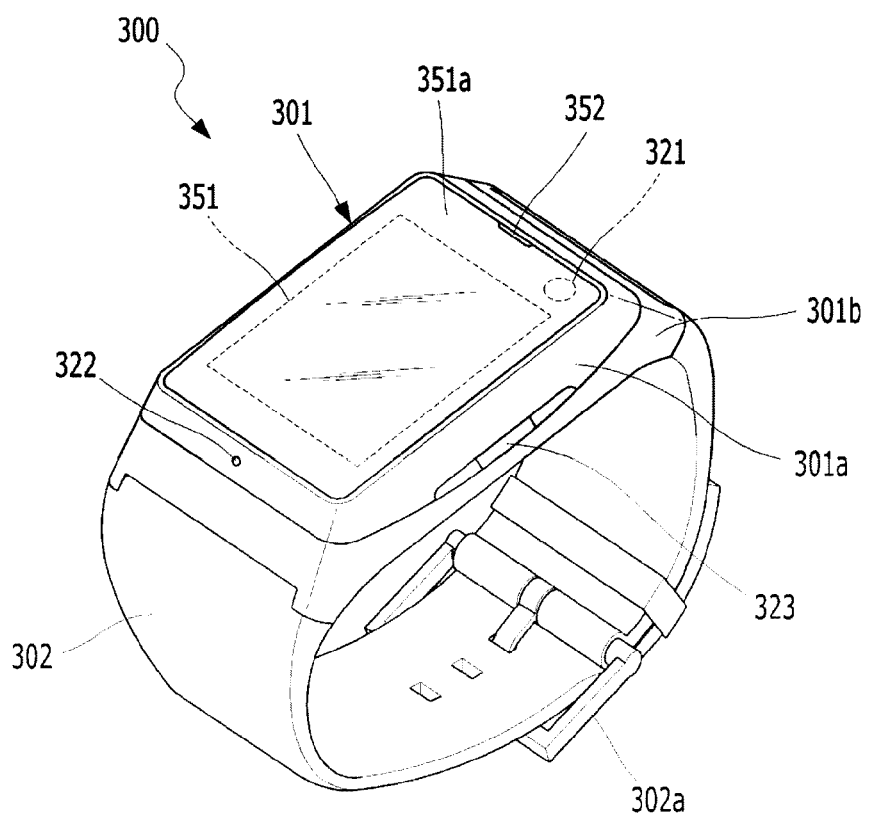
FIG. 3 is a perspective diagram for one example of a mobile terminal of a watch type related to another embodiment of the present invention.

FIG. 3 is a perspective view illustrating one example of a watch-type mobile terminal 300 in accordance with another exemplary embodiment.

As illustrated in FIG. 3, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIGS. 1A-1C.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351a is positioned on the first case 301a to form a front surface of the terminal body together with the first case 301a.

The illustrated embodiment includes audio output module 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion (not shown) electrically connected to the antenna to extend a ground area.

The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

Figure 4:
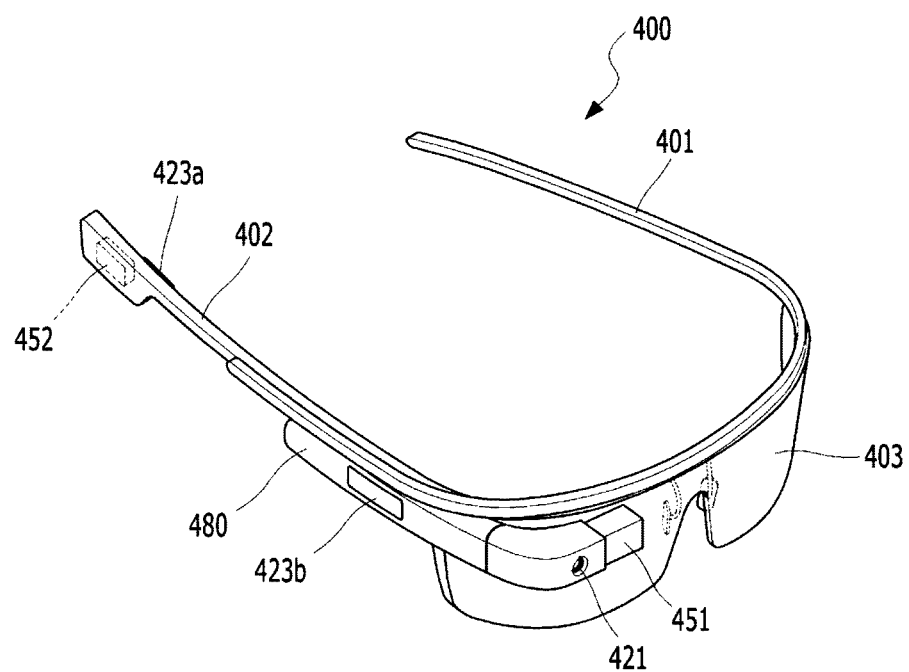
FIG. 4 is a perspective diagram for one example of a mobile terminal of a glass type related to further embodiment of the present invention.

FIG. 4 is a perspective view illustrating one example of a glass-type mobile terminal 400 according to another exemplary embodiment.

The glass-type mobile terminal 400 can be wearable on a head of a human body and provided with a frame (case, housing, etc.) therefor. The frame may be made of a flexible material to be easily worn. The frame of mobile terminal 400 is shown having a first frame 401 and a second frame 402, which can be made of the same or different materials. In general, mobile terminal 400 may be configured to include features that are the same or similar to that of mobile terminal 100 of FIGS. 1A-1C.

The frame may be supported on the head and defines a space for mounting various components. As illustrated, electronic components, such as a control module 480, an audio output module 452, and the like, may be mounted to the frame part. Also, a lens 403 for covering either or both of the left and right eyes may be detachably coupled to the frame part.

The control module 480 controls various electronic components disposed in the mobile terminal 400. The control module 480 may be understood as a component corresponding to the aforementioned controller 180. FIG. 4 illustrates that the control module 480 is installed in the frame part on one side of the head, but other locations are possible.

The display unit 451 may be implemented as a head mounted display (HMD). The HMD refers to display techniques by which a display is mounted to a head to show an image directly in front of a user's eyes. In order to provide an image directly in front of the user's eyes when the user wears the glass-type mobile terminal 400, the display unit 451 may be located to correspond to either or both of the left and right eyes. FIG. 4 illustrates that the display unit 451 is located on a portion corresponding to the right eye to output an image viewable by the user's right eye.

The display unit 451 may project an image into the user's eye using a prism. Also, the prism may be formed from optically transparent material such that the user can view both the projected image and a general visual field (a range that the user views through the eyes) in front of the user.

In such a manner, the image output through the display unit 451 may be viewed while overlapping with the general visual field. The mobile terminal 400 may provide an augmented reality (AR) by overlaying a virtual image on a realistic image or background using the display.

The camera 421 may be located adjacent to either or both of the left and right eyes to capture an image. Since the camera 421 is located adjacent to the eye, the camera 421 can acquire a scene that the user is currently viewing.

The camera 421 may be positioned at most any location of the mobile terminal. In some embodiments, multiple cameras 421 may be utilized. Such multiple cameras 421 may be used to acquire a stereoscopic image.

The glass-type mobile terminal 400 may include user input units 423a and 423b, which can each be manipulated by the user to provide an input. The user input units 423a and 423b may employ techniques which permit input via a tactile input. Typical tactile inputs include a touch, push, or the like. The user input units 423a and 423b are shown operable in a pushing manner and a touching manner as they are located on the frame part and the control module 480, respectively.

If desired, mobile terminal 400 may include a microphone which processes input sound into electric audio data, and an audio output module 452 for outputting audio. The audio output module 452 may be configured to produce audio in a general audio output manner or an osteoconductive manner. When the audio output module 452 is implemented in the osteoconductive manner, the audio output module 452 may be closely adhered to the head when the user wears the mobile terminal 400 and vibrate the user's skull to transfer sounds.

A communication system which is operable with the variously described mobile terminals 100 will now be described in more detail.

Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system.

A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1A is typically configured inside the mobile terminal 100 to receive broadcast signals transmitted by the BT.

Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

The location information module 115 is generally configured to detect, calculate, or otherwise identify a position of the mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the mobile terminal.

A typical GPS module 115 can measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. Furthermore, the GPS module can acquire speed information in real time to calculate a current position. Sometimes, accuracy of a measured position may be compromised when the mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module.

The Wi-Fi positioning system may include a Wi-Fi location determination server, a mobile terminal, a wireless access point (AP) connected to the mobile terminal, and a database stored with wireless AP information.

The mobile terminal connected to the wireless AP may transmit a location information request message to the Wi-Fi location determination server.

The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include one or more of media access control (MAC) address, service set identification (SSID), received signal strength indicator (RSSI), reference signal received Power (RSRP), reference signal received quality (RSRQ), channel information, privacy, network type, signal strength, noise strength, and the like.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database.

A method for extracting (analyzing) location information of the mobile terminal 100 may include a Cell-ID method, a fingerprint method, a trigonometry method, a landmark method, and the like.

The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly acquired. However, in the Cell-ID method, the precision of positioning may fall below a desired threshold when the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a mobile terminal using a known landmark transmitter.

In addition to these position location methods, various algorithms may be used to extract (analyze) location information of a mobile terminal.

Such extracted location information may be transmitted to the mobile terminal 100 through the Wi-Fi location determination server, thereby acquiring location information of the mobile terminal 100.

The mobile terminal 100 can acquire location information by being connected to at least one wireless AP. The number of wireless APs required to acquire location information of the mobile terminal 100 may be variously changed according to a wireless communication environment within which the mobile terminal 100 is positioned.

As previously described with regard to FIG. 1A, the mobile terminal may be configured to include short-range communication techniques such as Bluetooth™, Radio Frequency Identification (RFID), Infrared Data Association (IrDA), Ultra Wideband (UWB), ZigBee, Near Field Communication (NFC), Wireless USB (Wireless Universal Serial Bus), and the like.

A typical NFC module provided at the mobile terminal supports short-range wireless communication, which is a non-contactable type of communication between mobile terminals and generally occurs within about 10 cm. The NFC module may operate in one of a card mode, a reader mode, or a P2P mode. The mobile terminal 100 may further include a security module for storing card information, in order to operate the NFC module in a card mode. The security module may be a physical medium such as Universal Integrated Circuit Card (UICC) (e.g., a Subscriber Identification Module (SIM) or Universal SIM (USIM)), a secure micro SD and a sticker, or a logical medium (e.g., embedded Secure Element (SE)) embedded in the mobile terminal. Single Wire Protocol (SWP)-based data exchange may be performed between the NFC module and the security module.

In a case where the NFC module operates in a card mode, the mobile terminal may transmit card information on a general IC card to the outside. More specifically, if a mobile terminal having card information on a payment card (e. g, a credit card or a bus card) approaches a card reader, a short-range mobile payment may be executed. As another example, if a mobile terminal which stores card information on an entrance card approaches an entrance card reader, an entrance approval procedure may start. A card such as a credit card, a traffic card, or an entrance card may be included in the security module in the form of applet, and the security module may store card information on the card mounted therein. Card information for a payment card may include any of a card number, a remaining amount and usage history, and the like. Card information of an entrance card may include any of a user's name, a user's number (e.g., undergraduate number or staff number), an entrance history, and the like.

When the NFC module operates in a reader mode, the mobile terminal can read data from an external tag. The data received from the external tag by the mobile terminal may be coded into the NFC Data Exchange Format defined by the NFC Forum. The NFC Forum generally defines four record types. More specifically, the NFC Forum defines four Record Type Definitions (RTDs) such as smart poster, text, Uniform Resource Identifier (URI), and general control. If the data received from the external tag is a smart poster type, the controller may execute a browser (e.g., Internet browser). If the data received from the external tag is a text type, the controller may execute a text viewer. If the data received from the external tag is a URI type, the controller may execute a browser or originate a call. If the data received from the external tag is a general control type, the controller may execute a proper operation according to control content.

In some cases in which the NFC module operates in a P2P (Peer-to-Peer) mode, the mobile terminal can execute P2P communication with another mobile terminal. In this case, Logical Link Control Protocol (LLCP) may be applied to the P2P communication. For P2P communication, connection may be generated between the mobile terminal and another mobile terminal. This connection may be categorized as a connectionless mode which ends after one packet is switched, and a connection-oriented mode in which packets are switched consecutively. For a typical P2P communication, data such as an electronic type name card, address information, a digital photo and a URL, a setup parameter for Bluetooth connection, Wi-Fi connection, etc. may be switched. The P2P mode can be effectively utilized in switching data of a small capacity, because an available distance for NFC communication is relatively short.

Further preferred embodiments will be described in more detail with reference to additional drawing figures. It is understood by those skilled in the art that the present features can be embodied in several forms without departing from the characteristics thereof.

The mobile terminal mentioned in the foregoing description is applicable to an HMD mentioned in the following description, and it is apparent that construing the description with reference to the following drawings including FIG. 5 and the like supplementarily belongs to the scope of the appended claims and their equivalents.

Figure 5:
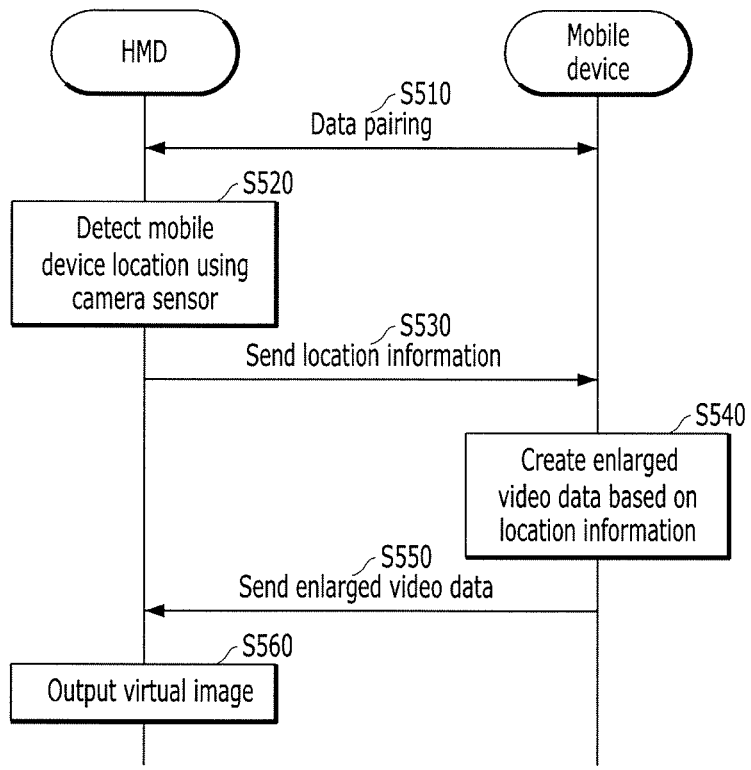
FIG. 5 is a flowchart for details of a dada communication flow between HMD and mobile device according to one embodiment of the present invention.

FIG. 5 is a flowchart for details of a dada communication flow between HMD and mobile device according to one embodiment of the present invention.

A system according to one embodiment of the present invention includes a mobile device and an HMD (head mounted display).

Referring to FIG. 5, a mobile device and an HMD are connected to each other through wired or wireless data communication [S510]. For the data pairing between the HMD and the mobile device, miracast technology, wi-fi direct technology or the like is applicable.

It is designed to detect a location of the mobile device using a sensor installed in the HMD [S520]. If image data captured by a camera is analyzed using pattern recognition algorithm, it is possible to recognize a location of the mobile device. According to another embodiment of the present invention, in order to raise a success rate of a location discovery and a recognition speed, an image 'a mark easily recognizable by a camera' is designed to be always displayed on a display screen of the mobile device or a mark is designed to be added to an outer surface of the mobile device, which also belongs to the scope of the appended claims and their equivalents.

The detected location information of the mobile device is sent from the HMD to the mobile device [S530], and the mobile device creates enlarged video data based on the sent location information of the mobile device [S540].

The created enlarged video data is sent to the HMD from the mobile device [S550], and the HMD is designed to output the sent enlarged video data [S560]. The enlarged video data may correspond to a virtual image outputted by the HMD of a see-through type.

The HMD further includes a memory storing additional information for recognizing the mobile device, a controller detecting the mobile device, and a controller calculating a location of the mobile device by referring to the additional information stored in the memory. The additional information includes a size of the mobile device and a 3D module data for example.

If a distance between the mobile device and the HMD is changed, the HMD is designed to change a location, from which the enlarged video data is outputted, by adjusting a distance between optical devices.

If the mobile device inclines over a preset angle, the HMD controls video data to be outputted in the same plane of a screen of the mobile device. This will be described in detail with reference to FIG. 16 later.

According to another embodiment of the present invention, further included are a step of detecting whether the according to one embodiment of the present invention inclines over a preset angle using a gyroscope sensor of the according to one embodiment of the present invention and a step of sending a result value of the detection to the HMD from the according to one embodiment of the present invention [not shown in FIG. 5]. Unlike the aforementioned embodiment of the present invention, according to further embodiment of the present invention, whether the mobile device inclines over a preset angle is designed to be detected by a camera of the HMD.

Figure 6:
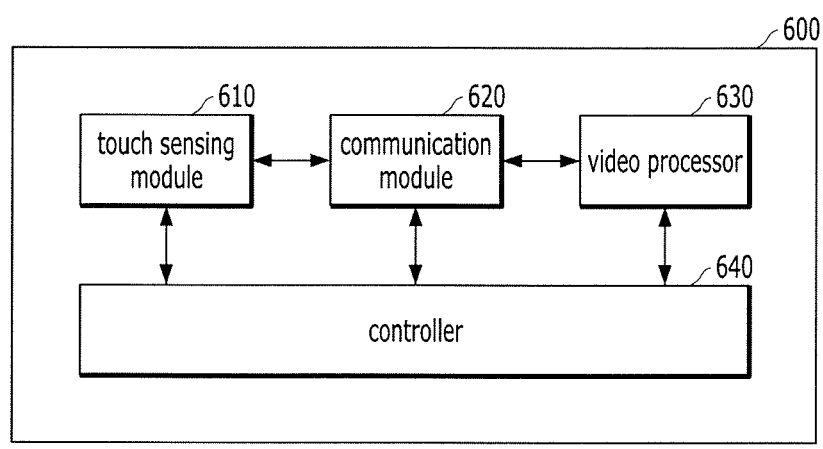
FIG. 6 is a block diagram of components of a mobile device according to one embodiment of the present invention.

FIG. 6 is a block diagram of components of a mobile device according to one embodiment of the present invention. FIG. 6 is a diagram to intensively describe a process in aspect of the mobile device described with reference to FIG. 5.

Referring to FIG. 6, a mobile device 600 according to one embodiment of the present invention includes a touch sensing module 610, a communication module 620, a video processor 630, a controller 640 and the like. As described with reference to FIG. 5, the mobile device 600 is designed to enable data communication with an HMD.

The touch sensing module 610 is designed to recognize a touch from a user, and the communication module 620 performs data communication with the HMD (head-mounted display).

If a relative location information between the mobile device and the HMD is received from the HMD, the video processor 630 creates enlarged video data based on the location information.

And, the controller 640 is designed to control the enlarged video data outputted by the HMD after the created enlarged video data has been sent to the HMD through the communication module 620.

If the mobile device located within a region, in which the enlarged video data outputted by the HMD is virtually displayed, moves away from the region, a display module is designed to output a different video data failing to be included in the enlarged video data outputted by the HMD [not shown in FIG. 6]. Meanwhile, if the mobile device located outside the region moves into the region, the controller 640 is designed to control the display module to stop outputting the different video data. This shall be described in detail with reference to FIGS. 19 to 21 later.

From a specific region within the region in which the enlarged video data outputted by the HMD is virtually displayed, if a random touch is sensed by the touch sensing module, the display module is designed to output a different video data according to a location or direction of the mobile device [not shown in FIG. 6]. Meanwhile, the specific region corresponds to a space for a character input, and the different video data corresponds to a graphic image of a keyboard type for the character input. This shall be described in detail with reference to FIGS. 13 to 17 later.

Figure 7:
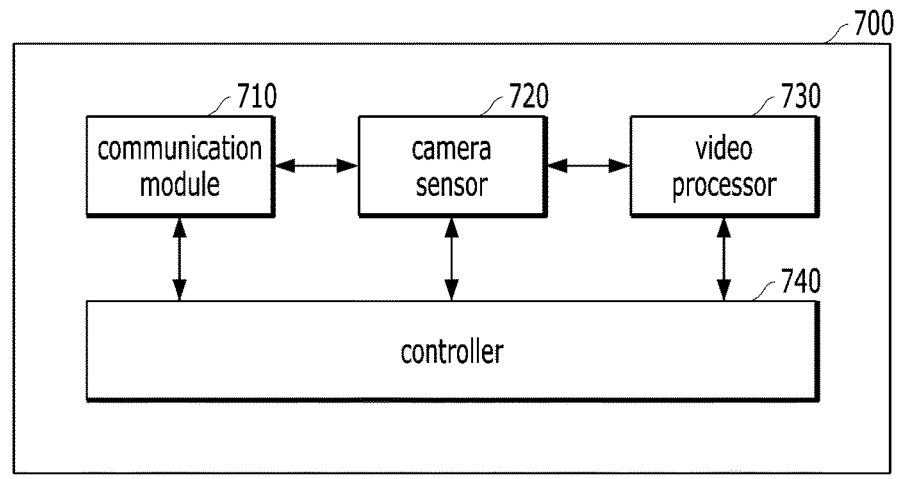
FIG. 7 is a block diagram of components of an HMD according to one embodiment of the present invention.

FIG. 7 is a block diagram of components of an HMD according to one embodiment of the present invention. FIG. 7 is a diagram to intensively describe a process in aspect of the HMD described with reference to FIG. 5.

Referring to FIG. 7, an HMD 700 according to one embodiment of the present invention includes a communication module 710, a camera sensor 720, a video processor 730, a controller 740 and the like. And, as described with reference to FIG. 5, the HMD 700 is designed to enable data communication with a mobile device. Moreover, the HMD described in the present specification may correspond to an HMD (head mounted display) of a see-through type or the like for example.

The communication module 710 performs data communication with a mobile device, and the camera sensor 720 is designed to detect a location of the mobile device.

The video processor 730 is designed to output video data as a virtual image. The controller 740 controls the communication module 710, the camera sensor 720 and the video processor 730 and is coupled with the communication module, the camera sensor and the video processor.

Moreover, the controller 740 is designed to control the communication module 710 to send the detected location information of the mobile device to the mobile device and receive enlarged video data from the mobile device. And, the controller 740 controls the video processor 730 to output the received enlarged video data as a virtual image.

According to another embodiment of the present invention, if a location of the mobile device fails to be detected over a preset count by the camera sensor 720, the controller 740 controls an operation of the camera sensor 720 to stop. Hence, unnecessary data loss can be prevented.

According to further embodiment of the present invention, the controller 740 controls the camera sensor 720 so as to determine whether the mobile device is located inside or outside a region having the enlarged video data displayed virtually therein. Moreover, the controller 740 controls the camera sensor 720 so as to determine whether the mobile device overlaps a specific region within the region having the enlarged video data displayed virtually therein. The specific region is designed to correspond to a space for a character input for example. This shall be described in detail with reference to FIG. 13, FIG. 14, FIG. 17, and FIGS. 19 to 21 later.

As simply described with reference to FIGS. 5 to 7, the present invention has a technical effect for using a touch display of a mobile device as an input device of an HMD through combination and extension of a big-screen imaginary image of the HMD (e.g., see-through type HMD) with an image displayed on the mobile device (e.g., smartphone). And, the present invention can expect an advantage of providing a user with a screen bigger than a physical display of a mobile device through combination and extension of a big-screen imaginary image of an HMD with surroundings of a display of the mobile device. Regarding this, problems of an existing mobile device are examined schematically and embodiments for solving the problems shall be described in detail with reference to FIGS. 9 to 23.

Figure 8:
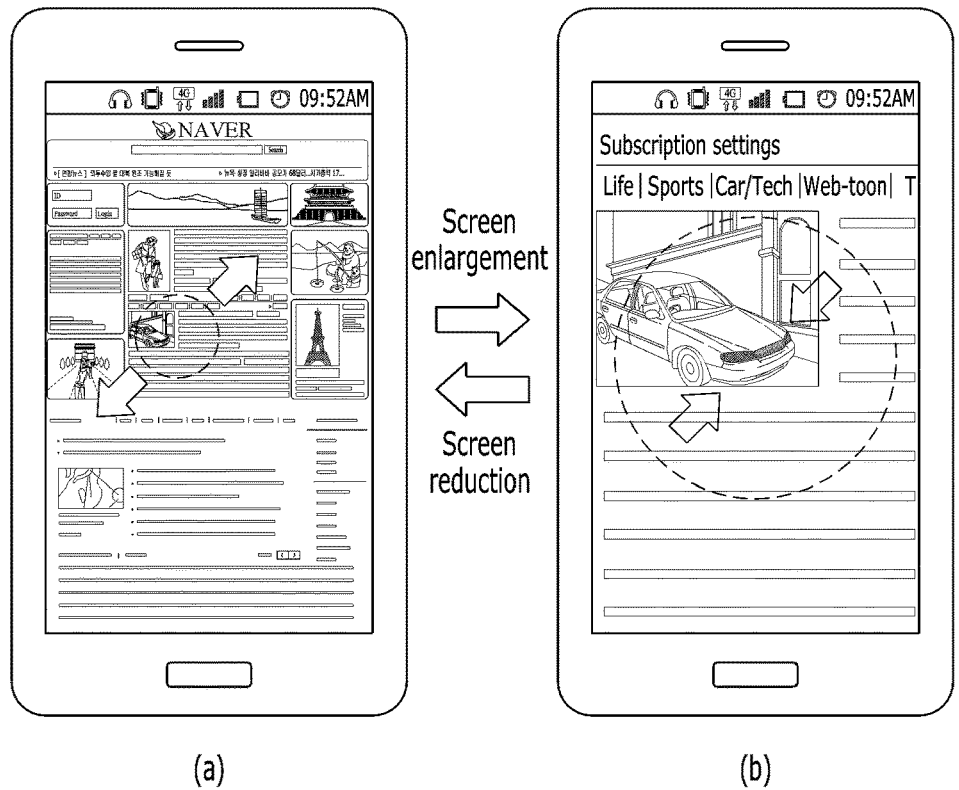
FIG. 8 is a diagram to describe a problem of a related art mobile device.

FIG. 8 is a diagram to describe a problem of a related art mobile device.

When an image (e.g., an image containing sub-contents such as small characters, logos, patterns and the like, a video, a website, etc.) is displayed in full size on a display of a mobile device according to a related art, as shown in FIG. 8 (*a*), since sub-contents (e.g., small characters, logos, patterns, etc.) in the image are too small to be viewed.

Hence, a user should enlarge a screen through a specific touch pattern so as to view the sub-contents in the image.

Yet, when the screen is enlarged, as shown in FIG. 8 (b), it causes a problem that the screen should be reduced to check the whole image again despite facilitating the sub-contents to be checked.

Namely, when a display of a mobile device having an existing small display size is used, it is basically impossible to simultaneously check a whole image and a sub-content without a separate manipulation (e.g., enlarge/reduce) due to physical limits (display size, pixel size). For such a reason, a display size of a recently developed mobile device tends to have an increasing display size. Yet, there is a problem in completely solving problems of portability, power consumption and the like.

In order to solve the above problems, it is intended to apply a technology of data pairing between a mobile device and an HMD. If so, a large-scale virtual image can be checked at a glance despite using a mobile device. And, there is a technical effect that an existing inconvenient interface is not necessary to control the HMD.

Figure 9:
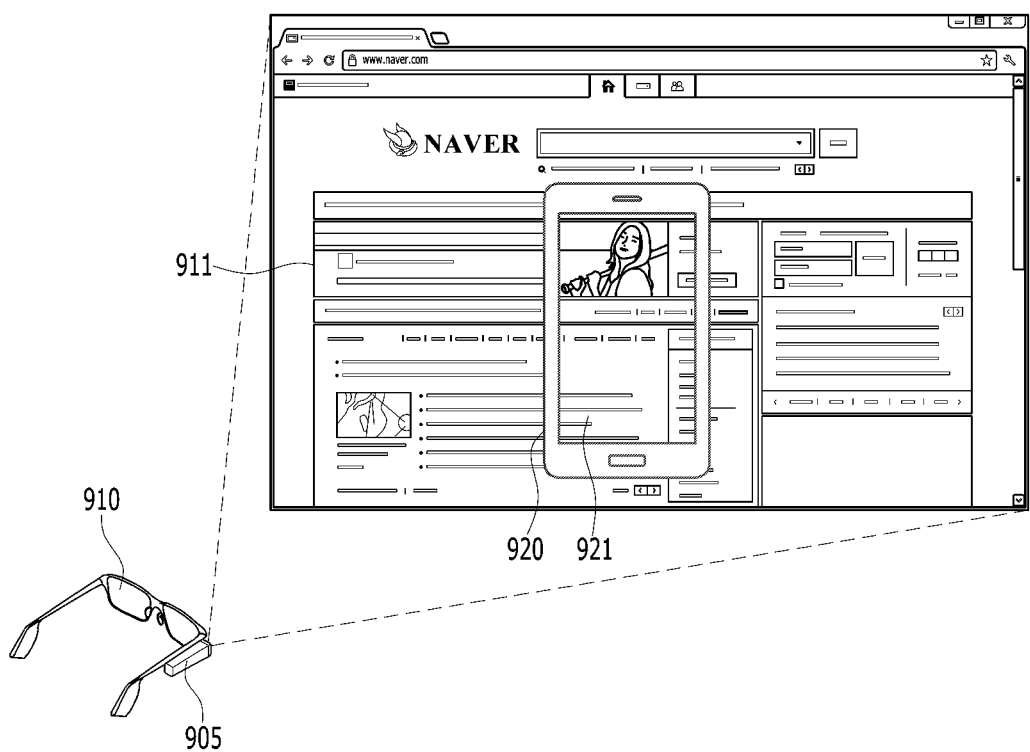
FIG. 9 is a diagram for one example of virtual images outputted by an HMD and mobile device according to one embodiment of the present invention.

FIG. 9 is a diagram for one example of virtual images outputted by an HMD and mobile device according to one embodiment of the present invention.

Meanwhile, in the present specification, an HMD is designed to output a virtual image near a mobile device located point. In this case, an embodiment of changing a state of a display of a mobile device into an off-state is possible. On the contrary, an embodiment of enabling a display of a mobile device to maintain an on-state belongs to the scope of the appended claims and their equivalents. Namely, in FIG. 9, for example, an image or video displayed on a display 921 of a mobile device 920 may include an image outputted by the mobile device 920 (i.e., screen-on state) or a virtual image outputted by an HMD (i.e., screen-off state).

Referring to FIG. 9, the display 921 of the mobile device 920 extends its display region by displaying a portion of an imaginary screen of the HMD 920. Namely, the mobile device 920 may feely move in an imaginary region and an image displayed on the display 921 may vary according to a moving location. Hence, a camera, a sensor 905 or the like attached to the HMD 910 is designed to track a location of the mobile device 920 periodically or aperiodically.

Figure 10:
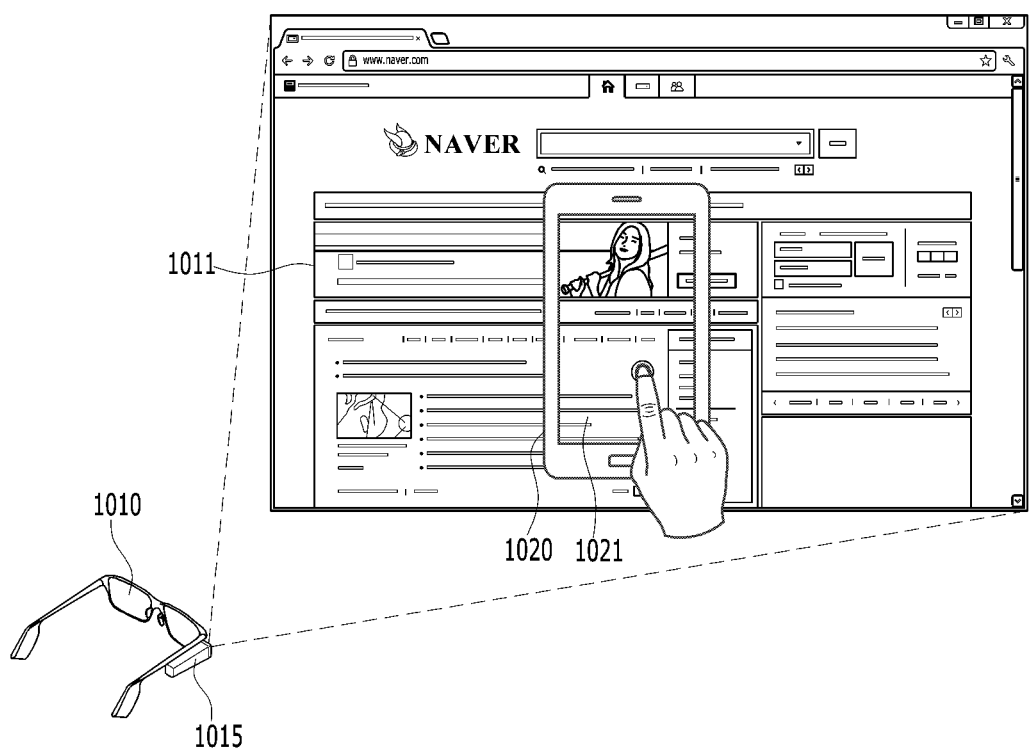
FIG. 10 is a diagram to describe a process for controlling a virtual image outputted by an HMD using a mobile device according to one embodiment of the present invention.

FIG. 10 is a diagram to describe a process for controlling a virtual image outputted by an HMD using a mobile device according to one embodiment of the present invention. FIG. 10 is provided to describe a process for providing a touch interface of a mobile device as an input tool of an HMD, whereas FIG. 9 is provided to describe a process for enlarging a display size of a mobile device.

Referring to FIG. 10, a virtual image 1011 outputted by an HMD 1010 is outputted, and a mobile device 1020 is located within the virtual image 1011. As mentioned in the foregoing description, an image displayed on a display 1021 is changed according to a location of the mobile device 1020. Particularly, if a specific point on the display 1021 is touched, the HMD 1010 is designed to output a changed virtual image received from a corresponding URL. Hence, the HMD 1010 can be advantageously controlled through a touch interface of the mobile device 1020.

Figure 11:
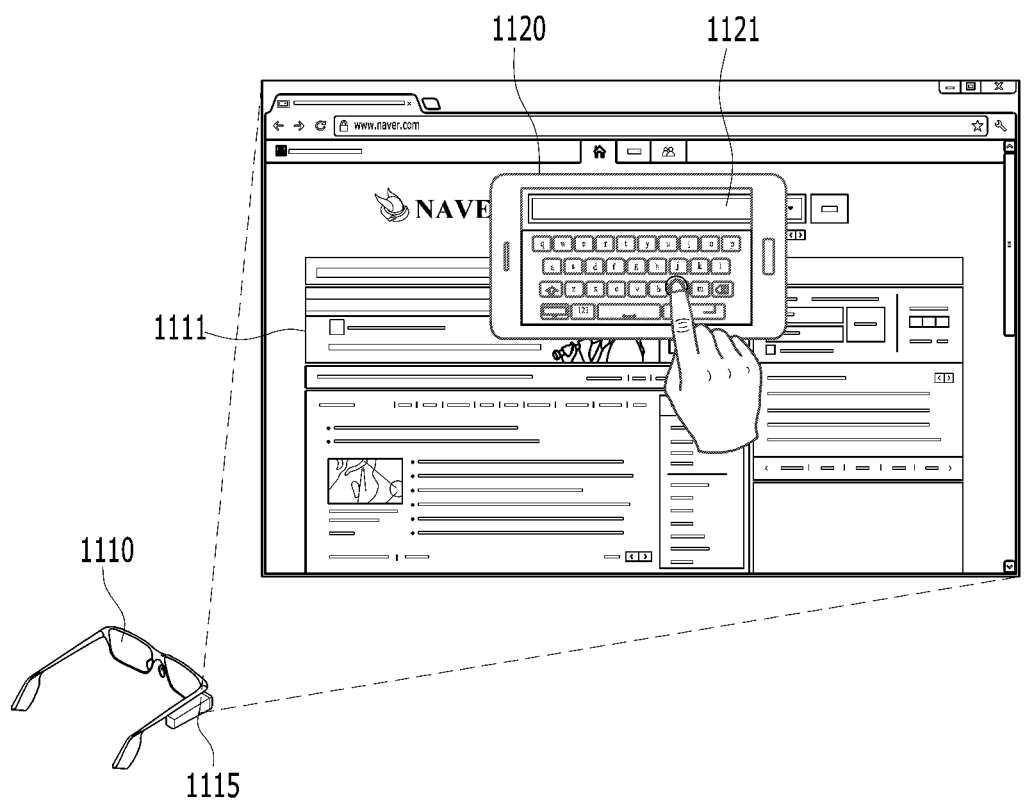
FIG. 11 is a diagram to describe a process for using a mobile device for a specific usage according to one embodiment of the present invention.

FIG. 11 is a diagram to describe a process for using a mobile device for a specific usage according to one embodiment of the present invention.

Referring to FIG. 11, an HMD 1110 is designed to output a virtual image 1111, and a camera sensor 1115 installed in the HMD is designed to track a location and motion of a mobile device 1120 and the like. Meanwhile, the virtual image 1111 outputted by the HMD 1110 may be received from the mobile device 1120, or may include data received through a memory or another network.

Meanwhile, if a location of the mobile device 1120 is located at a search word input window in the virtual image 1111, a display 1121 outputs a graphic image corresponding to a keyboard. Of course, if the display 1121 is in off-state, the graphic image corresponds to graphic data received from the HMD 1110.

Or, only if a location of the mobile device 1120 is located at the search word input window and a user's touch is recognized from the search word input window, a graphic image corresponding to a keyboard may be designed to be outputted. As the mobile device 1120 and the HMD 1110 are data-paired with each other, it is possible for the HMD 1110 to recognize that a prescribed point within the virtual image 1120 is touched.

Figure 12:
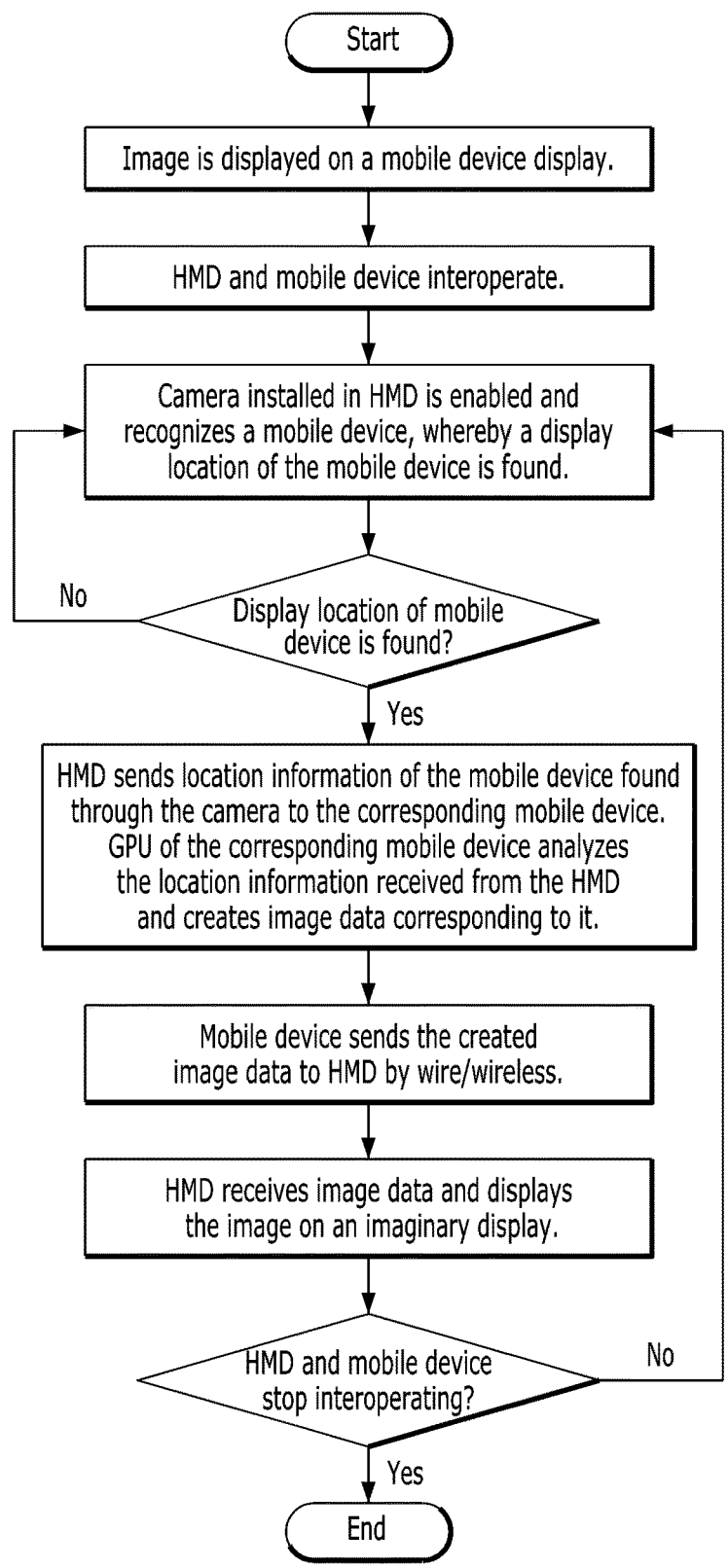
FIG. 12 is a flowchart to illustrate an operating sequence of an HMD and mobile device according to one embodiment of the present invention.

FIG. 12 is a flowchart to illustrate an operating sequence of an HMD and mobile device according to one embodiment of the present invention. FIG. 12 is provided to describe a process for inputting a command to an HMD using a touch display of a mobile device. Through the process shown in FIG. 12, the descriptions with reference to FIGS. 9 to 11 can be implemented.

Referring to FIG. 12, first of all, an image is displayed on a display of a mobile device. If a function proposed by the present invention is enabled, the mobile device and an HMD (e.g., a see-through type HMD) interoperates by wire/wireless.

A camera installed in the HMD is enabled and searches for a location of the display of the mobile device. If the location of the display is found, a corresponding location information is sent to the mobile device. If the location of the display of the mobile device is not confirmed, the camera of the HMD continues to search for the display location.

A GPU of the mobile device creates an extended image based on the display location information received from the HMD and sends the created extended image to the HMD. The HMD receives the image data and then displays it into an imaginary (virtual) display shown in one of FIGS. 9 to 11.

In order to check a display location of the mobile device, a sensor or camera can be added to the HMD. While the camera is operating, a controller (e.g., mobile AP) of the HMD should be able to recognize an object of the mobile device by analyzing an image captured by a camera sensor. Hence, location information of a display of a mobile device, posture information of the mobile device and the like can be designed to be used together, which belongs to the scope of the appended claims and their equivalents.

Yet, if mobile device recognition is impossible, the recognition is repeatedly attempted. If a specific attempt count limit is exceeded, an error message is sent to the controller and an operation of the camera is stopped.

In order to obtain display location information of a mobile device through a camera, an image analysis based object recognition technology may be used. To this end, an HMD is designed to store object recognition related information (e.g., exterior size, 3D model data, etc.) of at least one mobile device, which belongs to the scope of the appended claims and their equivalents.

And, recognition efficiency of a camera is raised by attaching a mark for recognition to a mobile device surface (exterior) or displaying a mark image on a display of a mobile device, which belongs to the scope of the appended claims and their equivalents.

According to another embodiment of the present invention, an inconvenient input mechanism of a related art HMD is substituted with a touch mechanism of a mobile device, thereby providing users with simple, convenient and intuitive user experiences.

Moreover, in order to improve the inconvenience experienced by a user in using a related art mobile device, a big-screen imaginary display of an HMD capable of overcoming a physical limit of a display size is introduced. Therefore, through an embodiment proposed by the present invention, contents (e.g., website, video, cartoon, etc.) difficult to be viewed due to a display size of a related art mobile device can be advantageously enjoyed through a big screen. And, amusements and games difficult to be played due to an inconvenient input mechanism of an HMD are advantageously facilitated as well.

Figure 13:
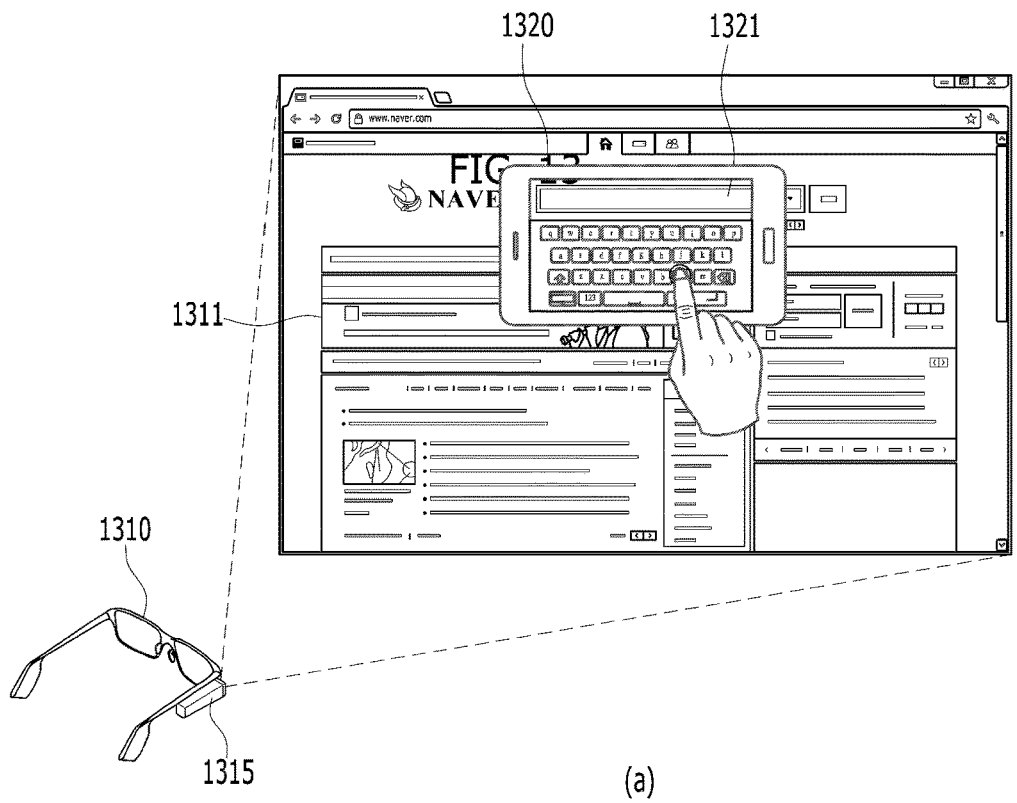
FIG. 13 is shows a graphic image changing to correspond to a horizontal/vertical direction of a mobile device according to one embodiment of the present invention.
Figure 13:
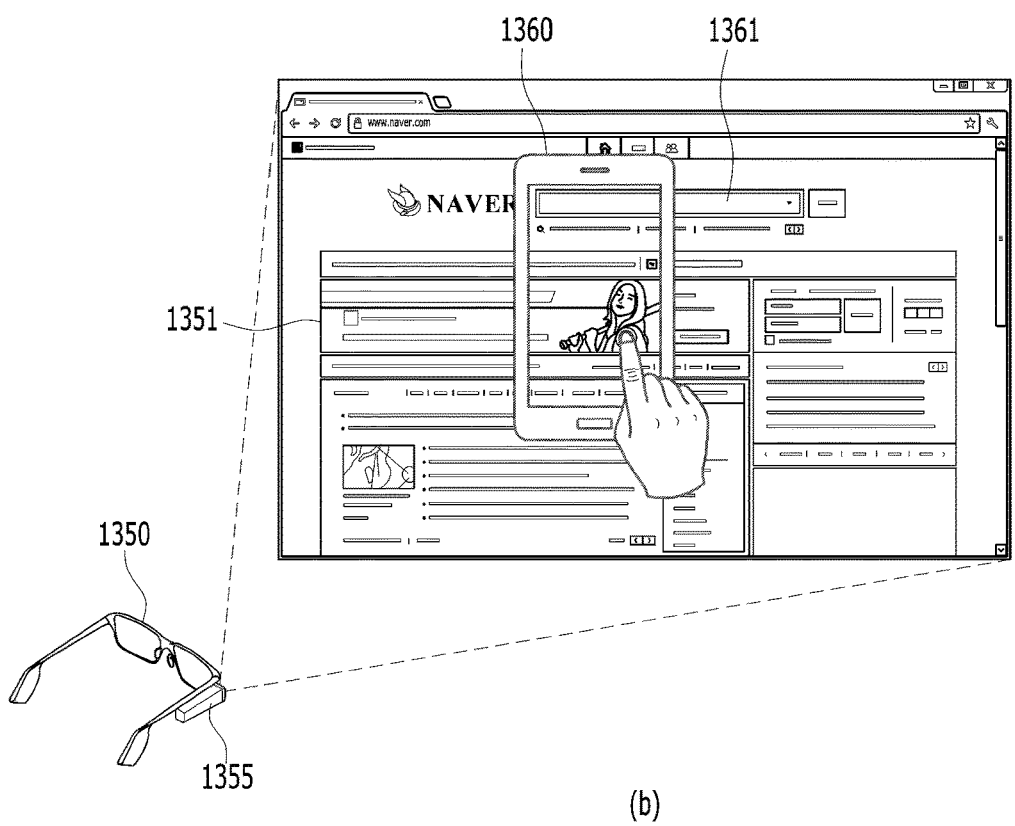

FIG. 13 is shows a graphic image changing to correspond to a horizontal/vertical direction of a mobile device according to one embodiment of the present invention.

Referring to FIG. 13, a graphic image different according to a horizontal/vertical direction of a mobile device is designed to be outputted. In FIG. 13, a random website containing a search window required for a character input is assumed.

Referring to FIG. 13 (a), an HMD 1310 displays an imaginary (virtual) image 1311. It is possible to detect a location of a mobile device 1320 using a camera 1315 of the HMD 1310.

Moreover, if the mobile device 1320 is located at a search window within the virtual image 1311 and a touch to the search window is detected, a display 1321 of the mobile device 1320 outputs a horizontally arranged keyboard. It is possible to sense a presence or non-presence of rotation, a direction and the like using a gravity sensor of the mobile device 1320.

Referring to FIG. 13 (b), an HMD 1350 displays an imaginary (virtual) image 1351. It is possible to detect a location of a mobile device 1360 using a camera 1355 of the HMD 1350.

Moreover, if the mobile device 1360 is located at a search window within the virtual image 1351 and a touch to the search window is detected, a display 1361 of the mobile device 1360 outputs a vertically arranged keyboard.

Meanwhile, according to further embodiment of the present invention, if a mobile device is located in a horizontal direction, the display 1321 is designed to output a keyboard related graphic image only. Yet, if the mobile device is located in a vertical direction, the display 1361 is designed to output a recent search word and the like as well as a keyboard related graphic image.

Figure 14:
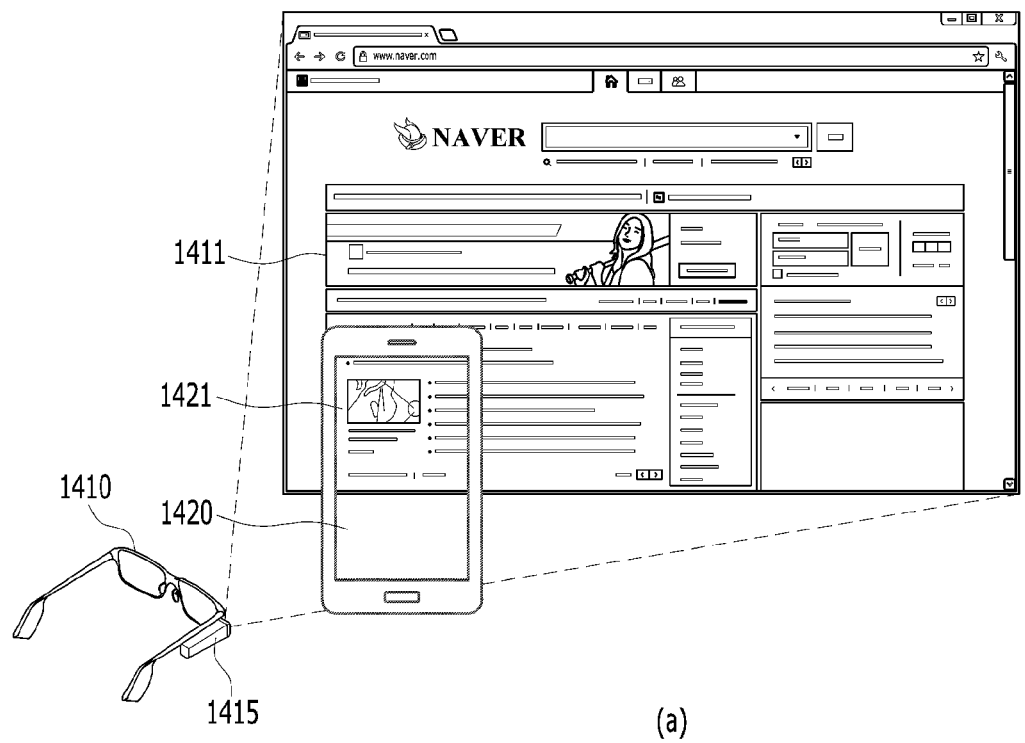
FIG. 14 shows a graphic image changing to correspond to a location of a mobile device according to one embodiment of the present invention.
Figure 14:
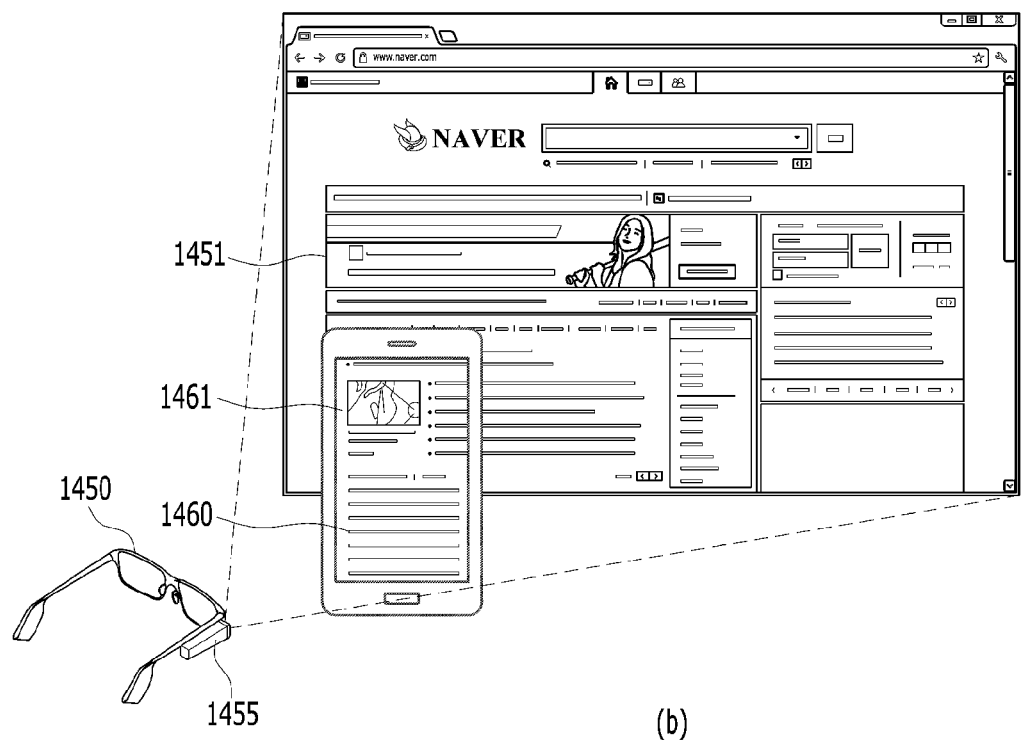

FIG. 14 shows a graphic image changing to correspond to a location of a mobile device according to one embodiment of the present invention. In the previous drawings, a mobile device is assumed as located exactly within an imaginary image outputted by an HMD. On the contrary, an embodiment for a case that a mobile device overlaps with an imaginary image of an HMD in part will be described with reference to FIG. 14.

Referring to FIG. 14 (a), an imaginary image 1411 outputted by an HMD 1410 is outputted. And, a mobile device 1420 is located at a place partially overlapping within the image 1411. As mentioned in the foregoing description, a location tracking of the mobile device 1420 is possible through a camera 1415 installed in the HMD 1410.

Hence, as shown in FIG. 14 (a), a corresponding image data is designed to be outputted to a first region overlapping with the imaginary image 1411 on a screen 1421 of the mobile device 1420, and a black screen is designed to be displayed on a second region only.

Meanwhile, FIG. 14 (b) shows an embodiment different from that shown in FIG. 14 (a).

Referring to FIG. 14 (b), an imaginary image 1451 outputted by an HMD 1450 is outputted. And, a mobile device 1460 is located at a place partially overlapping within the image 1461. As mentioned in the foregoing description, a location tracking of the mobile device 1460 is possible through a camera 1455 installed in the HMD 1450.

Hence, as shown in FIG. 14 (b), a corresponding image data is designed to be outputted to a first region overlapping with the imaginary image 1451 on a screen 1461 of the mobile device 1460, and the rest of the image data failing to be outputted by the imaginary image 1451 is designed to be outputted to a second region.

Meanwhile, video data outputted by an HMD may be received from a mobile device for example. Namely, the HMD receives the video data created by the mobile device by Miracast technology or the like and displays it on an imaginary display. If the HMD creates video data, numerous data operation processing and a relatively considerably amount of power consumption are required. Moreover, this is a design in consideration of a difficulty in using the HMD for a long time due to a small-capacity battery (due to weight issue) of the HMD. Of course, the scope of the appended claims and their equivalents is non-limited by the present embodiment.

Moreover, if a mobile device has an incoming call or message, a related information can be displayed on an imaginary screen of an HMD and controlled through a touch mechanism. This shall be described in detail with reference to FIG. 22 and FIG. 23 later.

Figure 15:
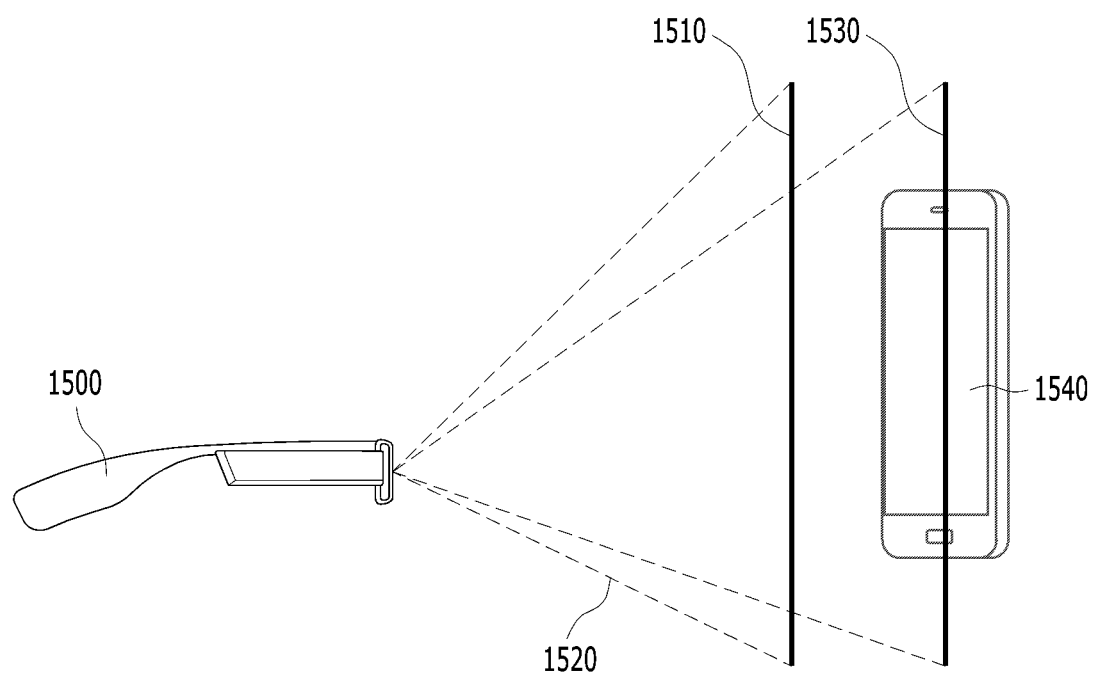
FIG. 15 shows a process for an HMD to output a vertical image to a location of a mobile device according to one embodiment of the present invention.

FIG. 15 shows a process for an HMD to output a vertical image to a location of a mobile device according to one embodiment of the present invention.

A see-through type HMD in a glass shape according to one embodiment of the present invention is designed to focus an imaginary image in a predetermined distance. For instance, the imaginary image is designed to be displayed in B inch (where, B is a positive number) in a distance of A feet (where, A is a positive number). Yet, if a distance to a mobile device from an HMD is changed, a solution for such a case is required.

Referring to FIG. 15, an HMD 1500 is designed to display an imaginary image in a specific size 1520 on a specific point 1510. Yet, a mobile device 1540 may be possibly located at a point 1530 farther than the location 1510 to which the imaginary image is initially outputted.

To solve such a problem, if a distance between the HMD 1500 and the mobile device 1540 is changed, it is designed that the location 1510 of the initial imaginary image is changed into the location 1530 of the mobile device 1540 by adjusting a distance between optical devices in the HMD according to the changed distance mechanically or electrically.

Figure 16:
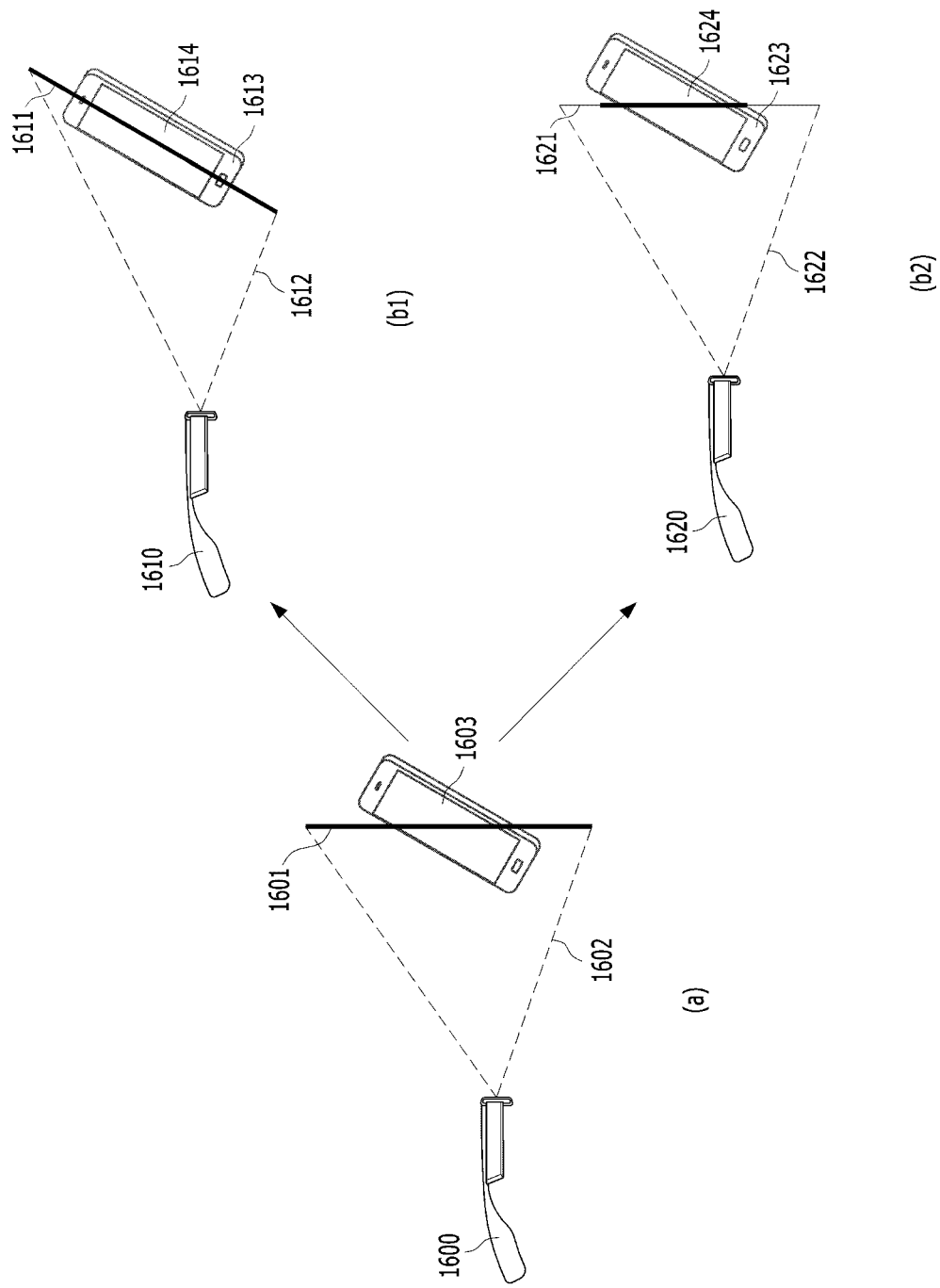
FIG. 16 shows a solution for solving a problem in case that a mobile device inclines.

FIG. 16 shows a solution for solving a problem in case that the mobile device inclines in FIG. 15. The embodiment for solving the problem of the case of changing a location of a mobile device is described with reference to FIG. 15. On the other hand, with reference to FIG. 16, an embodiment for solving a problem of a case of changing an inclination of a mobile device is described as follows.

Referring to FIG. 16 (a), as mentioned in the foregoing description with reference to FIG. 15, an HMD 1600 outputs an imaginary image in a preset size 1702 to a preset location 1601. Yet, if a mobile device 1603 inclines in a preset angle range (e.g., equal to or greater than angle A and equal to or smaller than angle B), it may be possibly difficult for the outputted imaginary image, and more particularly, for a portion overlapping with a display of the mobile device to be reproduced well. There are two kinds of embodiments for solving the problem expected in FIG. 16 (*a*), which are described with reference to FIG. 16 (*b*) and FIG. 16 (*c*), respectively.

Referring to FIG. 16 (*b*1), an imaginary image 1611 of an HMD 1610 is made to look as if located in the same plane of a display plane 1612 of a mobile device 1614 through image processing. Hence, an imaginary image 1613 inclining through the image processing is outputted.

Referring to FIG. 16 (*b*2), an image 1623 displayed on a mobile device is image-processed to look as if located in the same plane of an imaginary image plane 1621 of an HMD 1620. Hence, an image 1624 created through the image processing is outputted.

Figure 17:
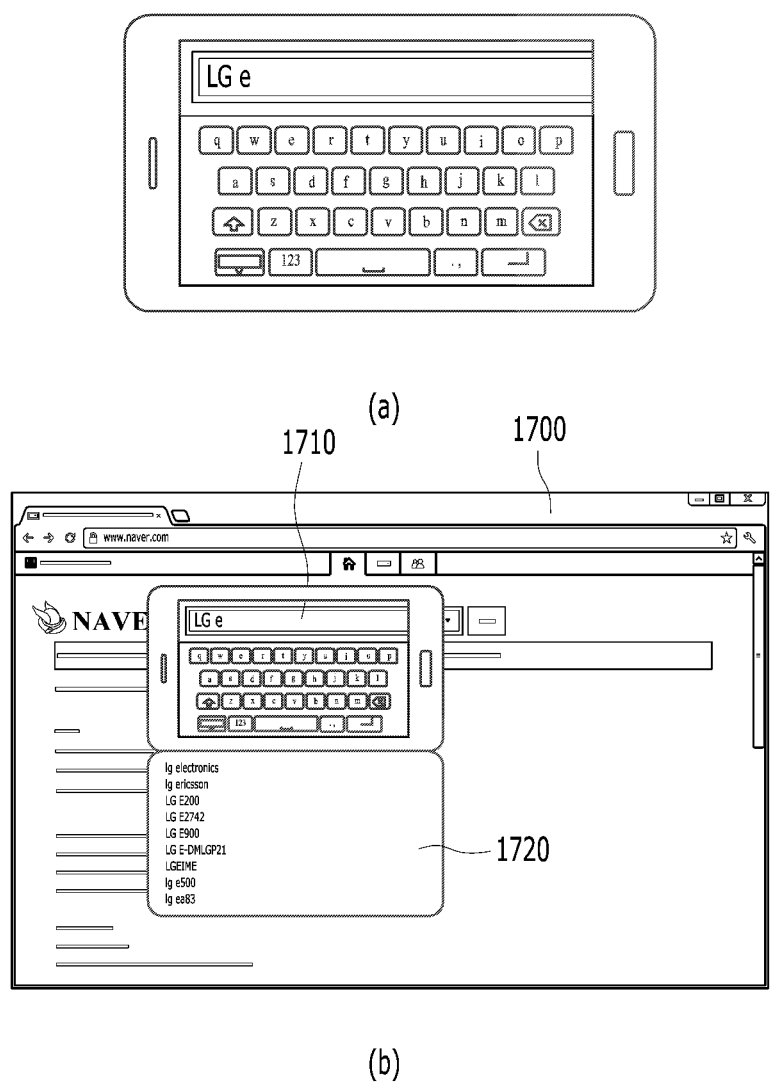
FIG. 17 shows a solution for solving a problem due to a limited display size of a related art mobile device.

FIG. 17 shows a solution for solving a problem due to a limited display size of a related art mobile device.

Referring to FIG. 17 (*a*), when a function 'search' is used using a mobile device, a partial keyword is outputted only or a keyword itself cannot be outputted, due to a limited display space.

Yet, if the present invention mentioned in the foregoing description is applied, as shown in FIG. 17 (*b*), a keyword list 1720, a search history and the like can be outputted within an imaginary image 1700 outputted by an HMD as well as a search window 1710. Yet, a location of the keyword history 1720 may be designed to be changeable according to a location of the mobile device.

Figure 18:
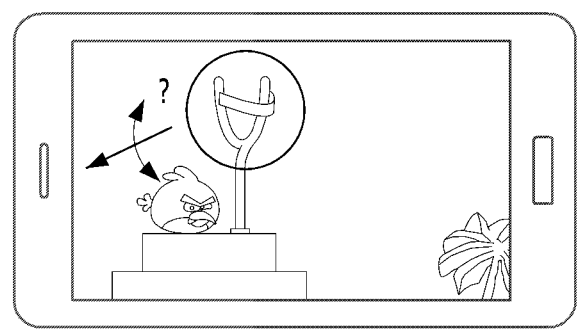
FIG. 18 shows a screen of running a mobile device and HMD applied specific application according to one embodiment of the present invention.
Figure 18:
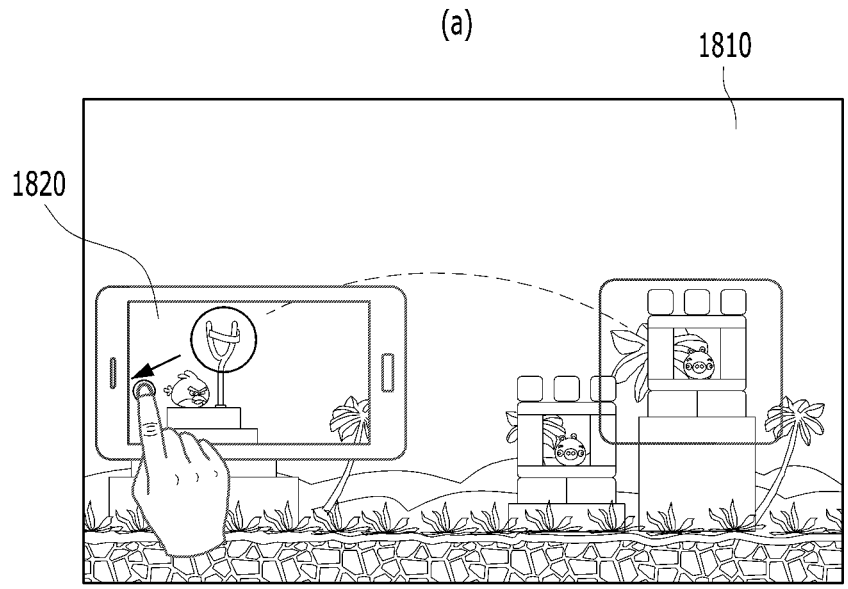

FIG. 18 shows a screen of running a mobile device and HMD applied specific application according to one embodiment of the present invention. If the present invention is applied, FIG. 18 shows the advantage in launching a game application.

Referring to FIG. 18 (*a*), a user of a related art mobile device has difficulty in checking 'full screen' provided by a CP at a time due to a limited display size, whereby a game control is performed very limitedly.

Yet, if the present invention is applied, as shown in FIG. 18 (*b*), a user locates a mobile device 1820 at a location intended to control within an imaginary image 1810 outputted by an HMD, thereby enabling a full screen viewing and a fine game control advantageously.

Figure 19:
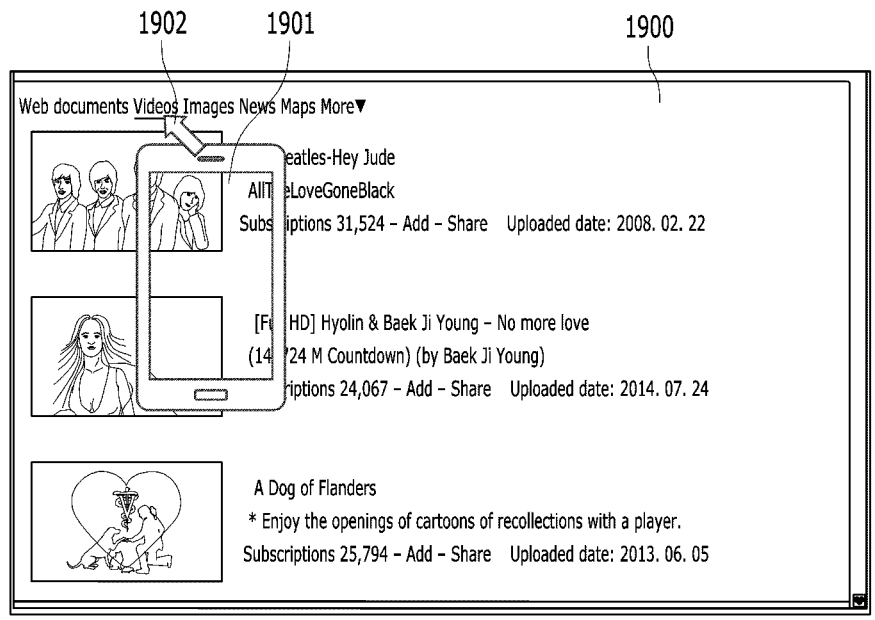
FIG. 19 shows one example of a graphic image changing in response to changing a location of a mobile device according to one embodiment of the present invention.
Figure 19:
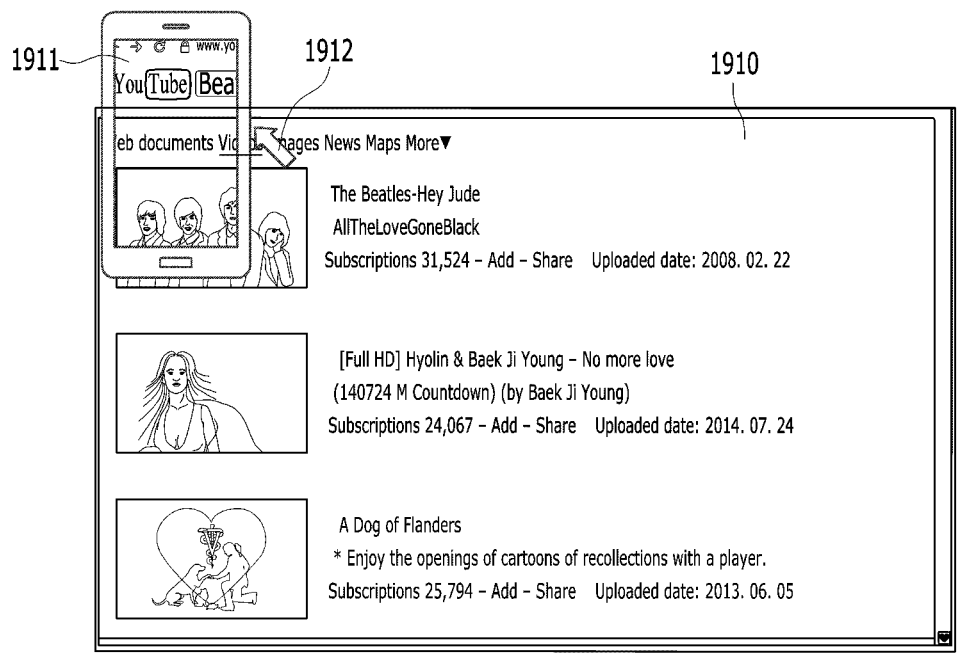

FIG. 19 shows one example of a graphic image changing in response to changing a location of a mobile device according to one embodiment of the present invention.

Referring to FIG. 19 (*a*), an HMD outputs an imaginary image 1900 and a mobile device 1901 is located within the imaginary image 1900. Meanwhile, assume a case that a shift 1902 is made in a manner that the mobile device 1901 is moved away from a region to which the imaginary image 1900 is outputted.

In doing so, referring to FIG. 19 (*b*), in case 1912 that the mobile device 1911 has been moved out of a range of the imaginary image 1910, a different image failing to be covered by the imaginary image 1910 is outputted from the mobile device 1911. In this case, assume a state that a display of the mobile device 1911 is turned on.

Figure 20:
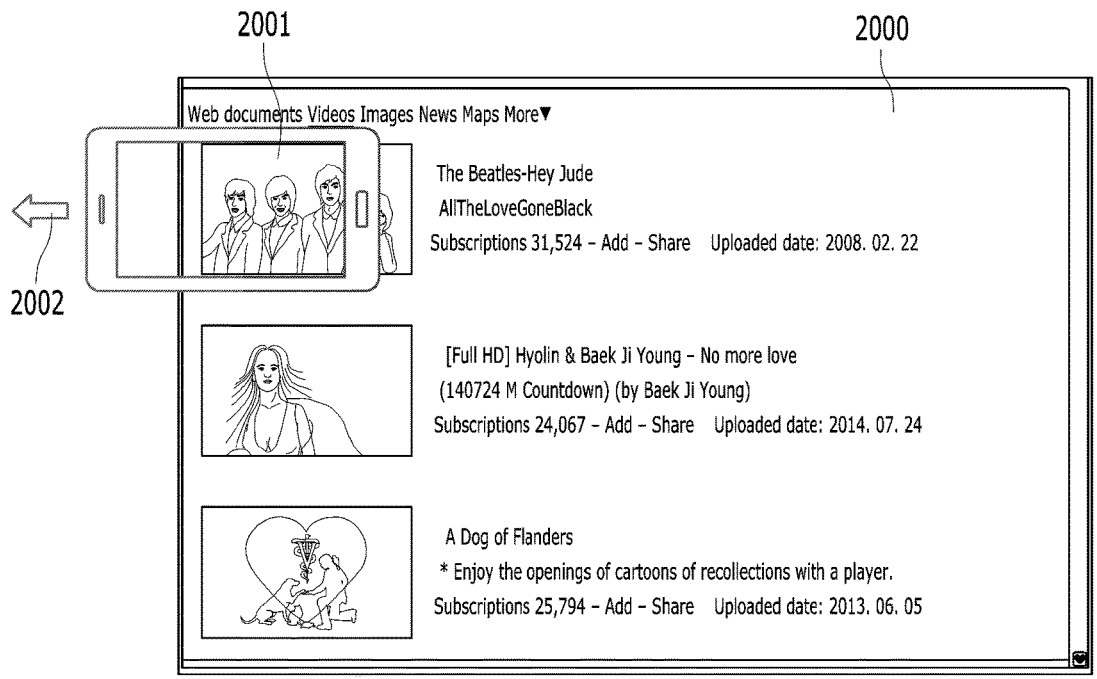
FIG. 20 shows another example of a graphic image changing in response to changing a location of a mobile device according to one embodiment of the present invention.
Figure 20:
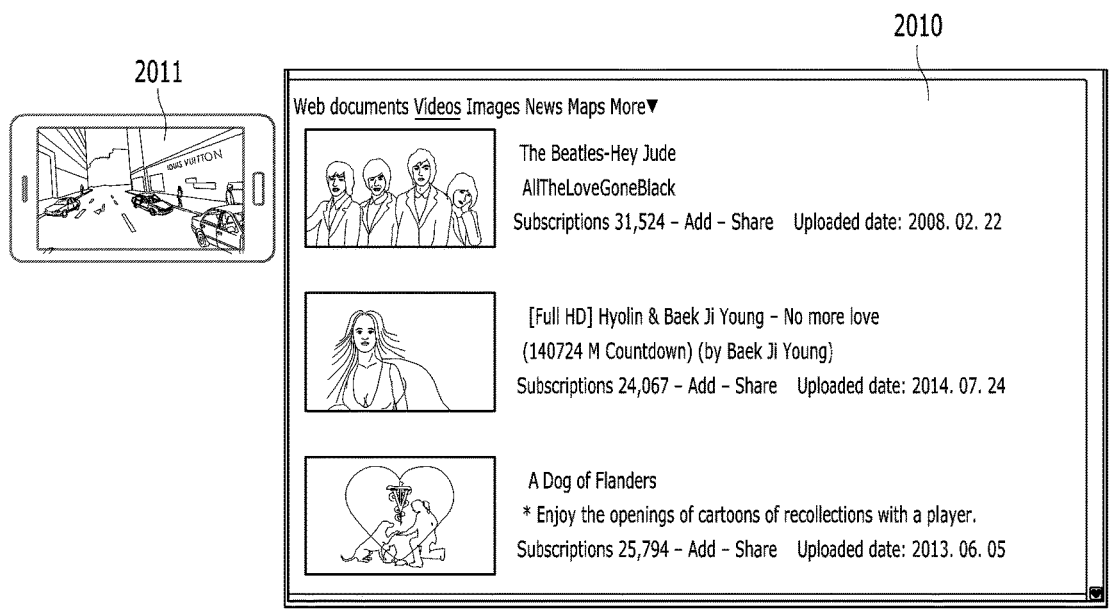

FIG. 20 shows another example of a graphic image changing in response to changing a location of a mobile device according to one embodiment of the present invention. FIG. 20 assumes a case that a touch input is added, whereas FIG. 19 assumes that there is no touch input.

Referring to FIG. 20 (*a*), an HMD outputs an imaginary image 2000 and a mobile device 2001 is moving away from the imaginary image [2002]. Particularly, assume that the mobile device 2001 is moving away from the imaginary image in a state that a content outputted from the mobile device 2001 is touched.

In doing so, referring to FIG. 20 (*b*), if the mobile device 2011 is completely separated out of the range of the imaginary image 2010, the mobile device 2011 is connected to a URL corresponding to the touched content or outputs a corresponding video. In this case, assume a state in which a display of the mobile device 2011 is turned on.

Figure 21:
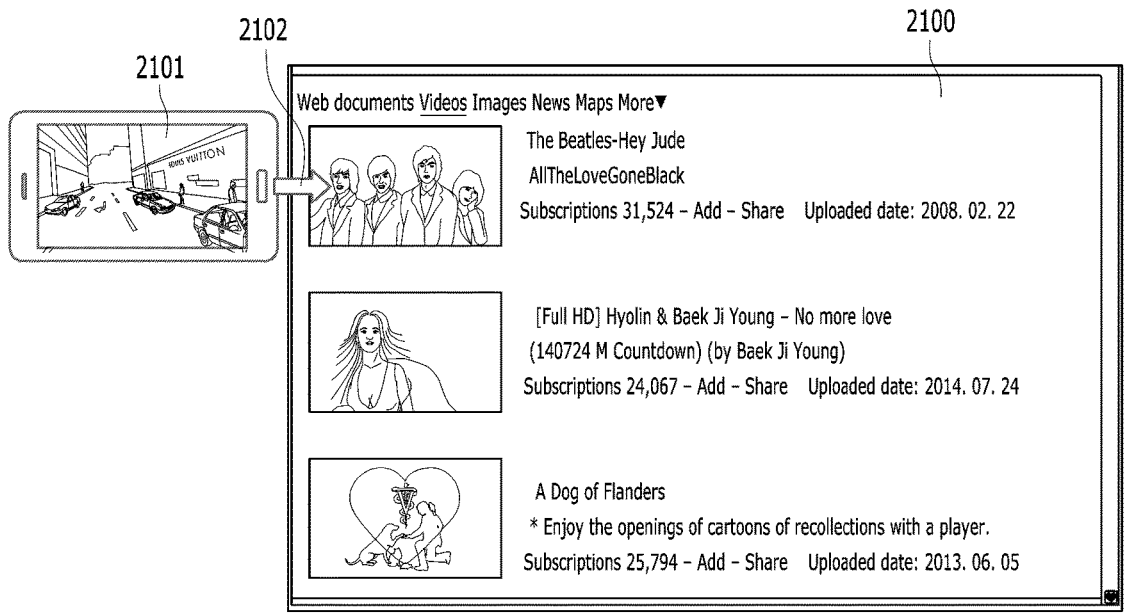
FIG. 21 shows further example of a graphic image changing in response to changing a location of a mobile device according to one embodiment of the present invention.
Figure 21:
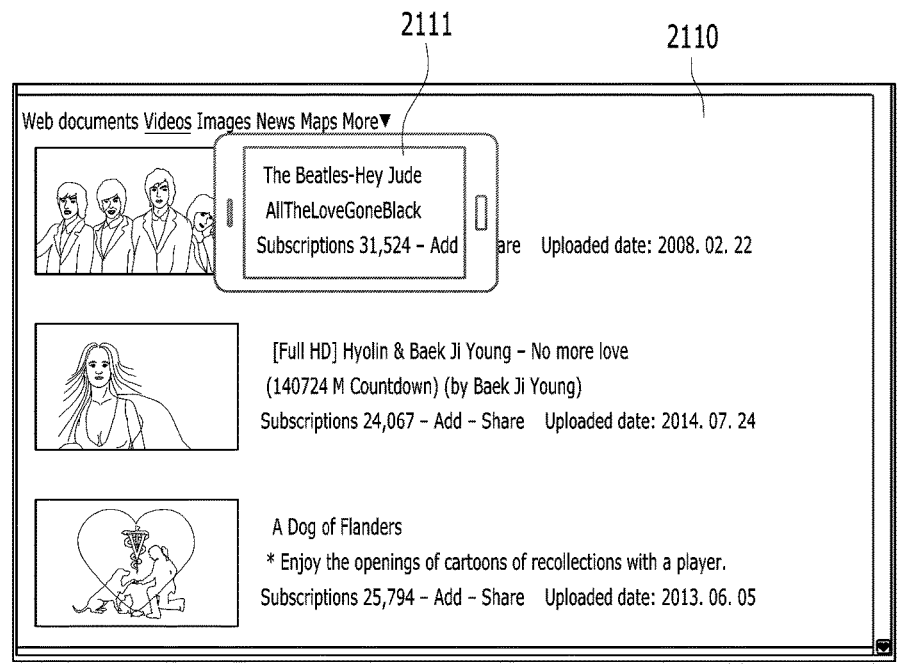

FIG. 21 shows further example of a graphic image changing in response to changing a location of a mobile device according to one embodiment of the present invention.

FIG. 20 assumes that a mobile device is completely separated out of an imaginary image outputted by an HMD. On the contrary, FIG. 21 intends to describe a reverse process.

Referring to FIG. 21 (*a*), assume a case that a mobile device 2101 moves into an imaginary image 2100 [2102]. In doing so, as shown in FIG. 21 (*b*), a display of the mobile device 2111 is turned off again and an imaginary image 2110 outputted by an HMD is displayed.

Figure 22:
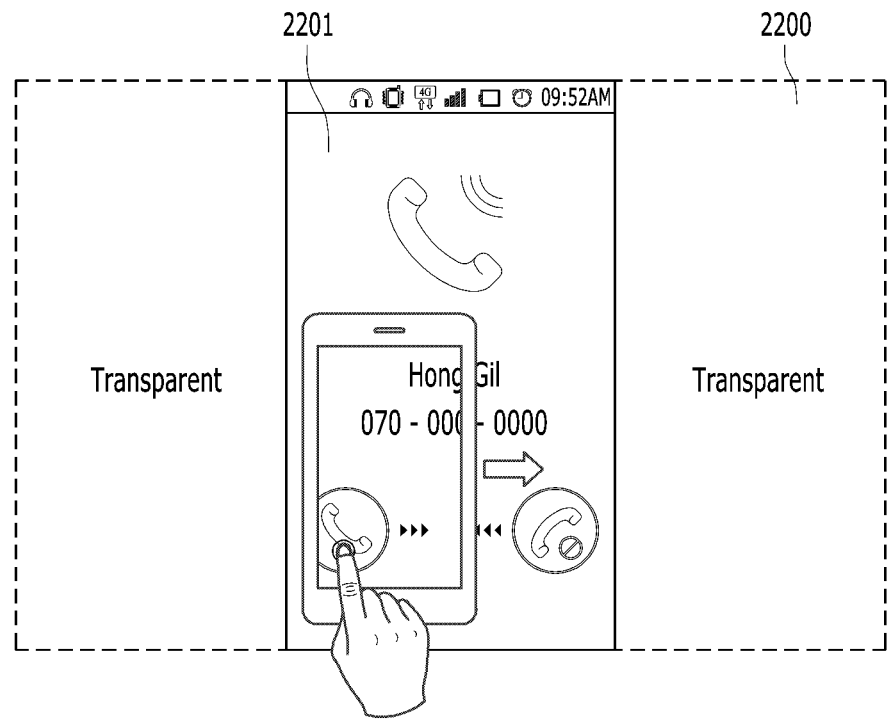
FIG. 22 shows one example of a graphic image outputted by an HMD if receiving a call signal through a mobile device according to one embodiment of the present invention.
Figure 22:
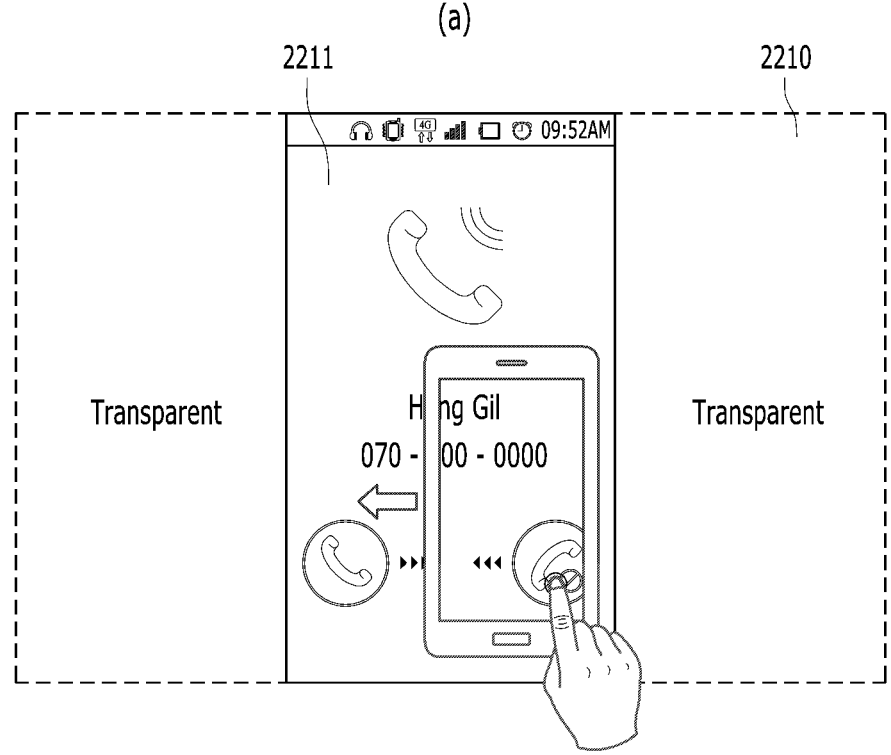

FIG. 22 shows one example of a graphic image outputted by an HMD if receiving a call signal through a mobile device according to one embodiment of the present invention. And, FIG. 23 shows another example of a graphic image outputted by an HMD if receiving a call signal through a mobile device according to one embodiment of the present invention.

Referring to FIG. 22 (*a*), if a mobile device 2201 receives an incoming call or text, an HMD outputs an imaginary image 2200 containing related data. Particularly, when there is an incoming call or text, a graphic image outputted by the mobile device 2201 can be used as it is.

Moreover, referring to FIG. 22 (*a*), if a drag is applied in a specific direction (right) from a specific point, a phone call and text service is performed through the mobile device 2201.

Meanwhile, referring to FIG. 22 (*b*), if a mobile device 2211 receives an incoming call, an imaginary image 2210 outputted by an HMD is displayed. In doing so, if a drag is applied in a specific direction (left) from a specific point, a command for declining a call us sent to a counterpart phone in direct or through a communication service.

Referring to FIG. 23, if a mobile device 2310 receives an incoming call, an imaginary image 2300 outputted by an HMD is displayed. Unlike the former description with reference to FIG. 22, a call accept or decline command can be generated by a touch with a specific gesture.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof If desired, the machine-readable medium may be realized in the form of a carrier wave (for example, a transmission over the Internet). The processor may include the controller 180 of the mobile terminal. As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

MODE FOR INVENTION

Other embodiments can be implemented by those skilled in the art, to which the present invention pertains, with reference to the related descriptions in BEST MODE FOR INVENTION.

INDUSTRIAL APPLICABILITY

As the present invention is applicable to mobile devices, televisions, wearable devices and the like for example, industrial applicability is expected.

What is claimed is:

1. A mobile device communicating with a head mounted display, comprising:
a display;
a touch sensing module recognizing a touch input;
a communication module performing data communication with the head mounted display;
a video processor outputting a partial image for a portion of a whole part of a content to the display; and
a controller receiving relative location information between the mobile device and the head mounted display from the head mounted display,
the controller creating an enlarged video data corresponding to a whole image of the content, which includes the partial image outputted from the display, based on the received relative location information, and
the controller controlling the created enlarged video data to be sent to the head mounted display.

2. The mobile device of claim 1, wherein the controller controls an image corresponding to a first region of a whole image to be outputted only to the first region overlapping with a virtual image for a whole image outputted by the head mounted display in a whole display region of the display based on the obtained relative location information.

3. The mobile device of claim 1, wherein the controller controls an image corresponding to a first region of a whole image to be outputted to the first region overlapping with a virtual image for a whole image outputted by the head mounted display in a whole display region of the display and also control the rest of the image failing to be outputted as a virtual image outputted from the head mounted display to a second region not overlapping with the virtual image in the whole display region of the display, based on the obtained relative location information.

4. The mobile device of claim 1, wherein based on the obtained relative location information, if the mobile device moves away from a first location in a virtual image outputted by the head mounted display into a second location outside the virtual image, the controller controls a content corresponding to the first location to be outputted to the display.

5. The mobile device of claim 1, wherein based on the obtained relative location information, if the mobile device is located at a first location in a virtual image outputted by the head mounted display, the controller controls an item corresponding to the first location of the outputted virtual image to be outputted to the display.

6. The mobile device of claim 1, wherein based on the obtained relative location information, the controller controls the display not to output the image to a first region overlapping with a virtual image outputted by the head mounted display in the whole display region of the display.

7. The mobile device of claim 1, wherein based on the obtained relative location information, the controller controls the display to output the partial image to correspond an inclination of a virtual image outputted from the head mounted display.

8. The mobile device of claim 1, wherein the controller controls the display to display a mark for the head mounted display to obtain the relative location information with the mobile device.

9. The mobile device of claim 1, wherein the controller controls the display to display an input interface related to a virtual image outputted from the head mounted display.

10. A method of operating a mobile device communicating with a head mounted display, comprising:
receiving relative location information between the mobile device and the head mounted display from the head mounted display;
creating an enlarged video data corresponding to a whole image of a content, which includes a partial image of the content outputted from the mobile device, based on the received relative location information; and
sending the created enlarged video data to the head mounted display.

11. The method of claim 10, further comprising:
outputting an image corresponding to a first region of a whole image to the first region overlapping with a virtual region outputted by the head mounted display in a whole display region of a display of the mobile device based on the obtained relative location information; and
outputting the rest of the image failing to be outputted as a virtual image outputted from the head mounted display to a second region not overlapping with the virtual image in the whole display region of the display of the mobile device.

12. The method of claim 10, further comprising outputting an image corresponding to a first region of a whole image only to the first region overlapping with a virtual image outputted by the head mounted display in a whole display region of a display of the mobile device based on the obtained relative location information.

13. The method of claim 10, further comprising based on the obtained relative location information, if the mobile device is located at a first location in a virtual image outputted by the head mounted display, outputting an item corresponding to the first location of the outputted virtual image to a display of the mobile device.

14. The method of claim 10, further comprising based on the obtained relative location information, outputting an image corresponding to an inclination of a virtual image outputted from the head mounted display to a display of the mobile device.

15. A head mounted display capable of data communication with a mobile device, comprising:
a communication module performing the data communication with the mobile device;
a camera;
a video processor outputting a virtual image; and
a controller determining a location of the mobile device located within the outputted virtual image based on an image captured by the camera,
the controller controlling location information on the determined location of the mobile device to be sent to the mobile device.

16. The head mounted display of claim 15, wherein based on the location information on the determined mobile device location, the controller controls the video processor to output the virtual image in response to a distance from the mobile device.

17. The head mounted display of claim 15, wherein the controller recognizes an inclination of the mobile device based on the captured image and controls the video processor to output the virtual image in response to the recognized inclination of the mobile device.

18. The head mounted display of claim 15, wherein if the mobile device is not detected from the image captured by the camera, the controller controls the camera to stop operating.

19. The head mounted display of claim 15, wherein the controller recognizes a mark displayed on the mobile device based on the captured image and determines the location of the mobile device based on the recognized mark.

20. The head mounted display of claim 15, wherein the video processor outputs the virtual image of a see-through type.

* * * * *